United States Patent [19]

Adachi et al.

[11] Patent Number: 5,672,137

[45] Date of Patent: Sep. 30, 1997

[54] CONTROL APPARATUS FOR CONTINUOUSLY VARIABLE TRANSMISSION MOUNTED IN AUTOMOTIVE VEHICLE

[75] Inventors: Kazutaka Adachi, Yokohama; Shigeru Ishii, Atsugi; Hideki Sudo, Machida, all of Japan

[73] Assignee: Nissan Motor Co., Ltd., Yokohama, Japan

[21] Appl. No.: 637,069

[22] Filed: Apr. 24, 1996

[30] Foreign Application Priority Data

Apr. 24, 1995 [JP] Japan ................... 7-098712

[51] Int. Cl.⁶ .................................................. B60K 41/12
[52] U.S. Cl. ........................... 477/45; 477/46; 477/48; 364/424.08
[58] Field of Search ................... 477/45, 43, 46, 477/48, 49; 364/424.08, 424.082, 424.094

[56] References Cited

U.S. PATENT DOCUMENTS

| | | | |
|---|---|---|---|
| 4,720,793 | 1/1988 | Watanabe et al. | 477/48 X |
| 5,042,323 | 8/1991 | Murano et al. | 477/45 |
| 5,042,325 | 8/1991 | Sawasaki et al. | 477/45 |
| 5,062,049 | 10/1991 | Taylor | 364/424.082 |
| 5,074,166 | 12/1991 | Yamashita et al. | 477/45 X |
| 5,144,864 | 9/1992 | Sawasaki et al. | 477/45 X |
| 5,161,433 | 11/1992 | Sakakibara et al. | 477/43 |
| 5,218,541 | 6/1993 | Sakakibara et al. | 364/424.094 |
| 5,257,188 | 10/1993 | Sakakibara et al. | 364/424.082 |
| 5,444,346 | 8/1995 | Sudo et al. | 318/616 |
| 5,514,047 | 5/1996 | Tibbles et al. | 477/46 |
| 5,558,596 | 9/1996 | Adachi et al. | 477/48 X |
| 5,609,544 | 3/1997 | Lardy et al. | 477/46 |

FOREIGN PATENT DOCUMENTS

| | | |
|---|---|---|
| 59-217047 | 7/1984 | Japan . |
| 3-121358 | 5/1991 | Japan . |

*Primary Examiner*—Charles A. Marmor
*Assistant Examiner*—Peter T. Kwon
*Attorney, Agent, or Firm*—Foley & Lardner

[57] ABSTRACT

In a control apparatus for controlling a gear shift ratio of a continuously variable transmission mounted in an automotive vehicle as an automatic power transmission, a gear shift ratio command value is calculated using a control constant corresponding to a dynamic characteristic determined for each instantaneous gear shift ratio of the continuously variable transmission so as to achieve a target gear shift ratio response characteristic. In addition, a disturbance compensator (robust compensator) of a robust type filter is used against a disturbance such as a parameter variation to achieve a gear shift ratio control characteristic that a designer of the control apparatus has desired to achieve in cases where the parameter variation occurs due to a load variation, a change in an environment temperature or deterioration of an oil viscosity in a hydraulic pressure mechanism which creates a pressing force on each of drive and driven pulleys of the continuously variable transmission and where an individual difference in the dynamic characteristic of the continuously variable transmission due to a working and/or assembly accuracy of a power transmission part of the continuously variable transmission occurs.

10 Claims, 19 Drawing Sheets

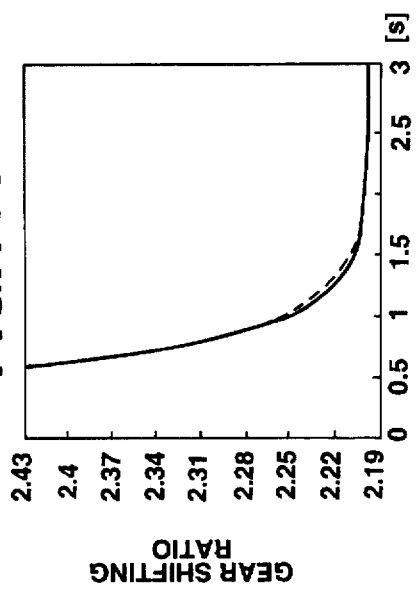
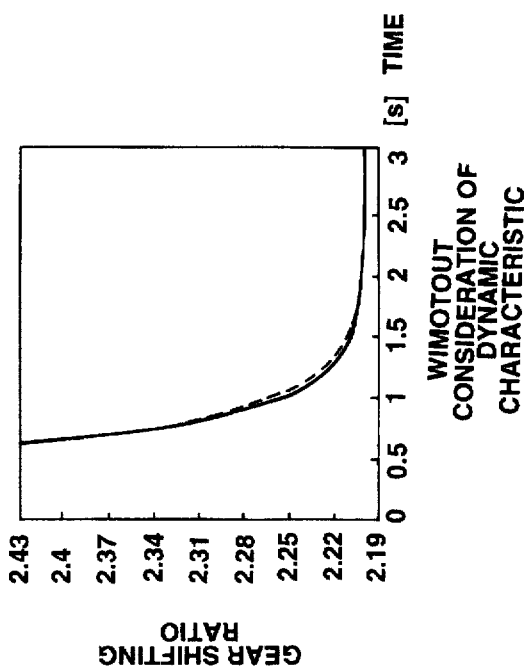
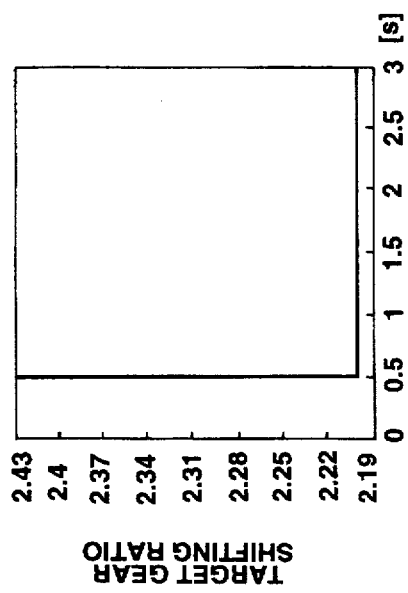
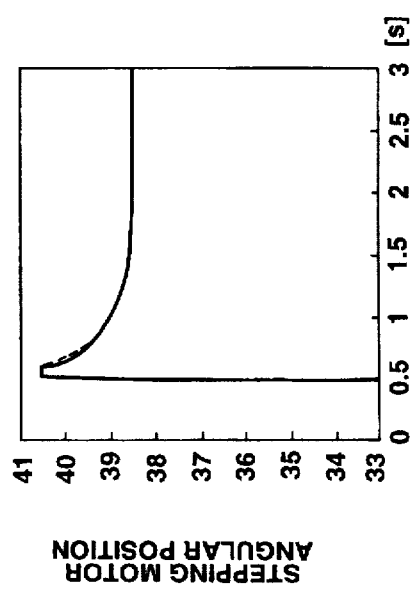

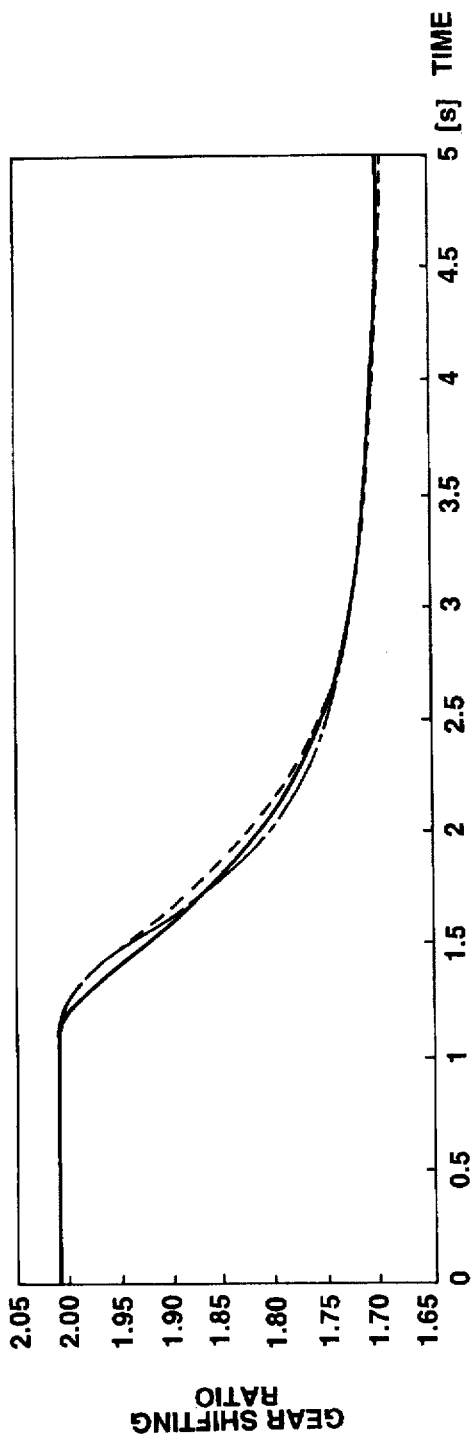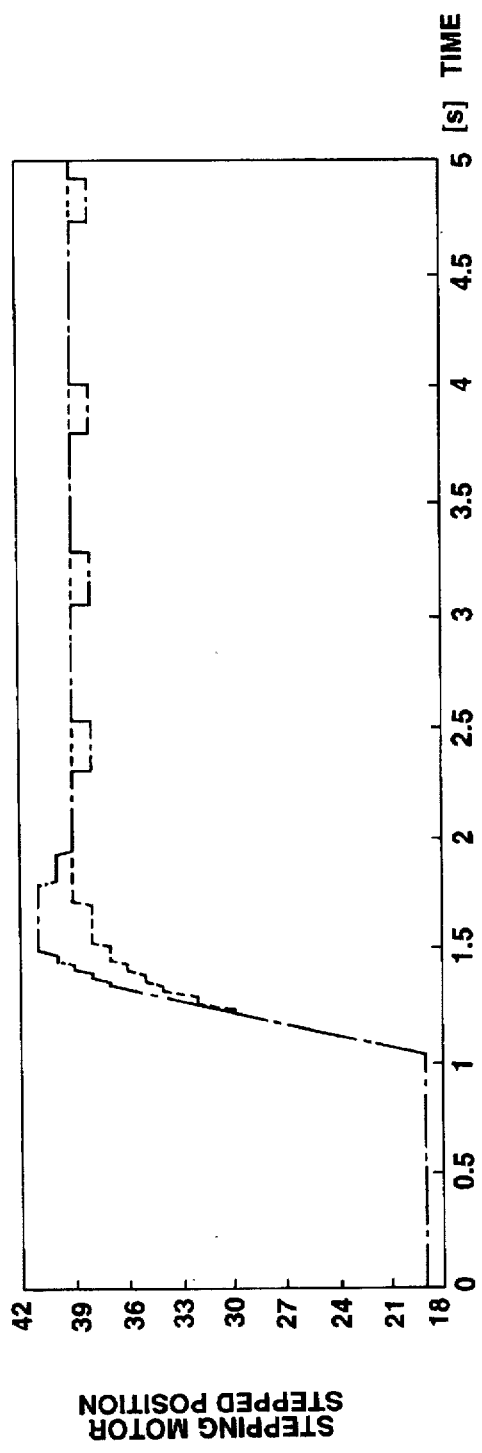

CONTROL APPARATUS FOR CONTINUOUSLY VARIABLE TRANSMISSION MOUNTED IN AUTOMOTIVE VEHICLE

BACKGROUND OF THE INVENTION

The present invention relates to a control apparatus for a continuously variable transmission mounted in an automotive vehicle as an automatic power transmission with a disturbance compensator.

A kind of the continuously variable transmission to be applied to an automatic power transmission of the automotive vehicle includes, for example, a pair of drive pulley and driven pulley whose pulley widths contacted against a V-shaped belt are variably controlled according to the hydraulic pressure and a gear shift ratio of the continuously variable transmission is continuously varied by controlling the pulley width of each pulley. The gear shift ratio is varied in accordance with a predetermined pattern according to a vehicle driving condition such as a vehicle speed, engine revolution speed, and vehicle load, an opening angle of a gear shift ratio control valve associated with each pulley being controlled on the basis of the detected vehicle driving condition.

Japanese Patent Application First Publications No. Heisei 3121358 published on May 23, 1991 and No. Showa 59-217047 published on Dec. 1, 1984 exemplify previously proposed control systems for actuators to control opening angles of gear shift ratio control valves of the continuously variable transmissions, each of which is designed to achieve appropriate gear shift ratio response characteristics according to a predicted vehicle driving condition, in order to improve a vehicular acceleration performance, a fuel consumption, and a comfortability of the vehicle.

However, there arises a problem such that even if each of the control systems described in the above-identified Japanese Patent Application First Publications outputs an appropriate gear shift ratio command value as a target value of each of the control systems, the associated continuously variable transmission does not always indicate a gear shift ratio response as a designer has desired to achieve and a desired control effect cannot be achieved.

Causes that such a problem as described above rises may be considered as follows:

1) A relationship between a hydraulic pressure applied to a gear shift ratio varying mechanism and an actual gear shift ratio of the continuously variable transmission is not always in a proportional relationship.

2) Dynamic characteristics of a gear shift ratio exhibited when a gear shifting operation is carried out from a certain gear shift ratio to another gear shift ratio are not uniform since a flow quantity of working oil is different according to the hydraulic pressure applied to the gear shift ratio varying mechanism.

3) When such a gear shift control valve as having a different characteristic in a direction to which the gear shifting up is carried out and in a direction to which a gear shifting down is carried out is applied to the continuously variable transmission in order to enable the gear shifting operation during, e.g., occurrence of failure in the gear shift ratio varying mechanism, the gear shift ratio response is different depending on the direction of the gear shift ratio (high gear shift ratio or low gear shift ratio). Consequently, a deviation occurs from the target gear shift ratio control characteristic that the designer of the control system is desired to achieve.

SUMMARY OF THE INVENTION

It is, therefore, an object of the present invention to provide an improved control apparatus of a continuously variable transmission mounted in an automotive vehicle which is so designed as to achieve a desired gear shift ratio response that a designer of the control apparatus has desired to achieve without deviation of the gear shift ratio irrespective of dynamic characteristics that the applied continuously variable transmission naturally has and/or variations in operating parameters.

The above-described object can be achieved by providing a control apparatus for an automotive vehicle, comprising:

a) a continuously variable transmission, including a gear shift ratio varying mechanism and whose gear shift ratio is continuously controlled according to an operating variable of said gear shift ratio varying mechanism, said gear shift ratio varying mechanism being so arranged and constructed as to continuously vary the gear shift ratio of the continuously variable transmission according to a gear shift ratio command value;

b) a first sensor which is so arranged and constructed as to detect a vehicle driving condition of the vehicle in which the continuously variable transmission is mounted;

c) a second sensor which is so arranged and constructed as to detect an actual gear shift ratio of the continuously variable transmission; and d) a control unit having;

e) a target gear shift ratio calculating block for calculating a target gear shift ratio on the basis of the detected vehicle driving condition;

f) a dynamic characteristic estimating block for estimating a predetermined dynamic characteristic for each instantaneous gear shift ratio of the continuously variable transmission;

g) a disturbance compensator which is so arranged and constructed as to calculate a disturbance compensation output as functions of the actual gear shift ratio and of either the gear shift ratio command value or the operating variable of the gear shift ratio varying mechanism;

h) a gear shift ratio control constant calculating block for calculating a control constant of each instantaneous gear shift ratio of the continuously variable transmission so as to achieve a target dynamic characteristic using the estimated dynamic characteristic;

i) a first gear shift ratio command calculating block for calculating a first gear shift ratio command value from the target gear shift ratio, the actual gear shift ratio, and the control constant of the corresponding instantaneous gear shift ratio; and j) a second gear shift ratio command calculating block for subtracting the disturbance compensation output of the disturbance compensator from the first gear shift ratio command value so as to derive and output the gear shift ratio command value, and the control apparatus further comprising;

k) a gear shift ratio control block for adjustably controlling the operating variable of the gear shift ratio varying mechanism as the function of the output gear shift ratio command value.

to which a control apparatus according to the present invention is applicable.

Figure 1:
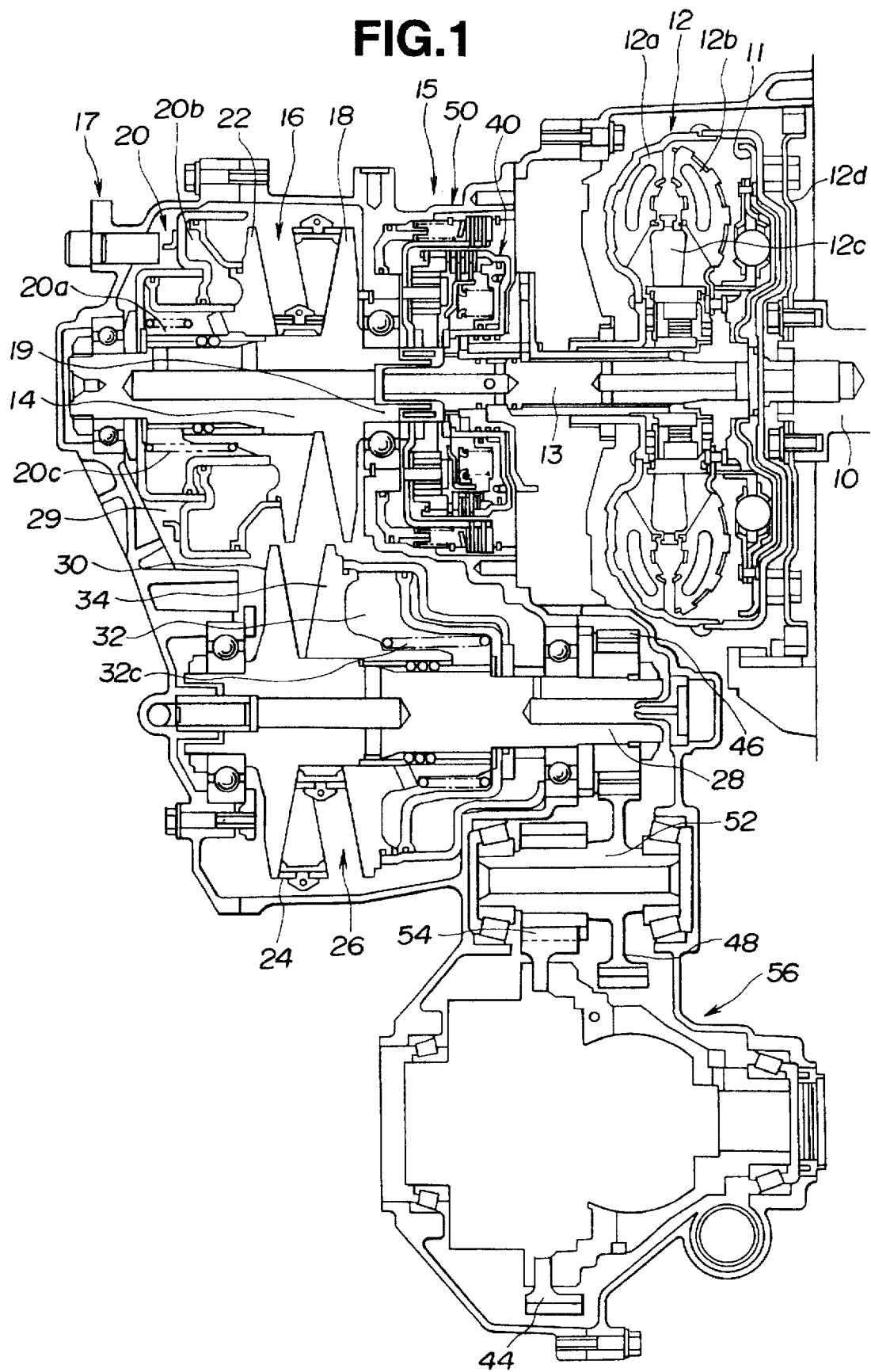
FIG. 1 is a longitudinally cross sectioned view of a continuously variable transmission (a vehicular automatic transmission of the continuously variable transmission type)
Figure 2:
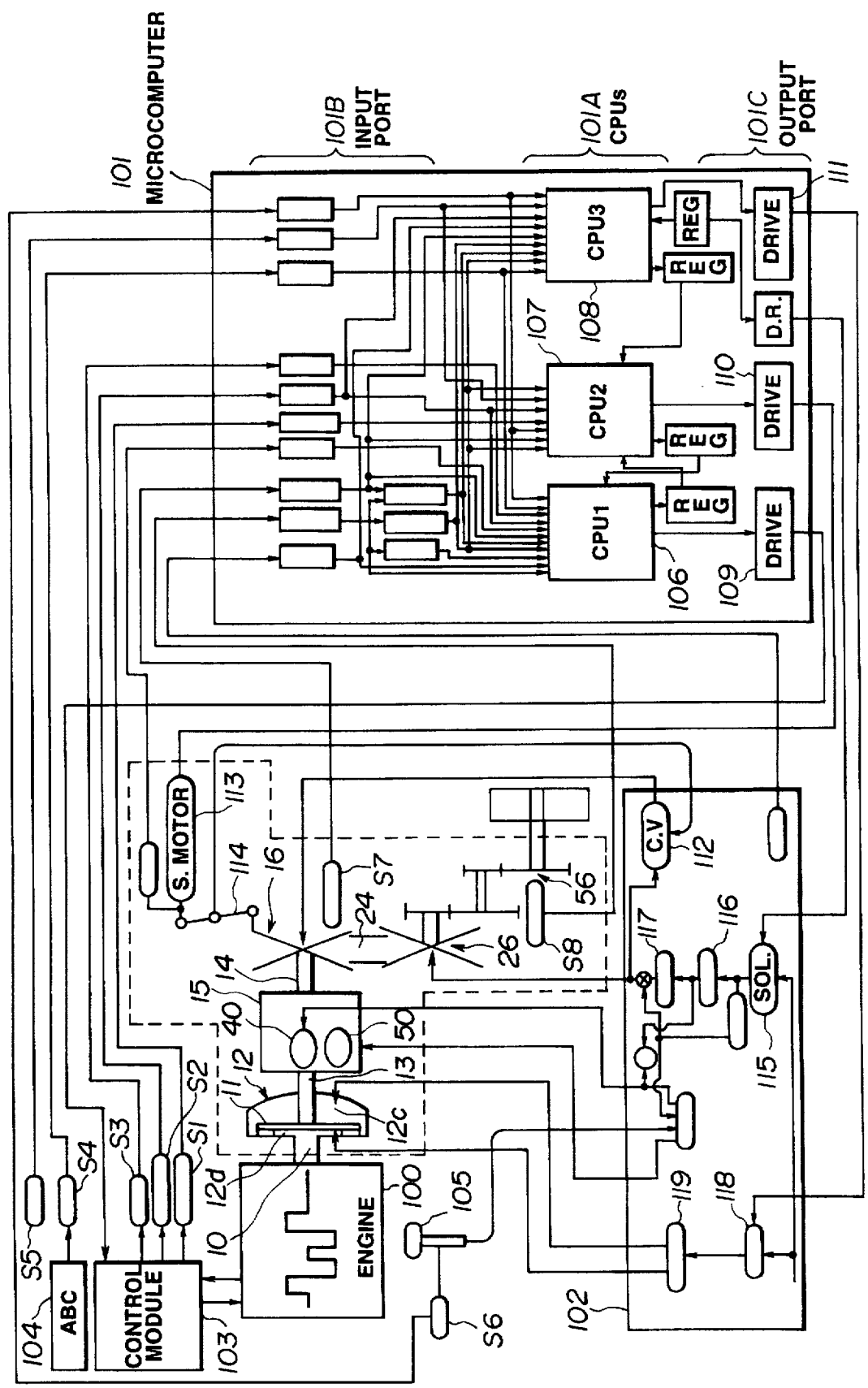

FIG. 2 is a schematic circuit block diagram of a whole control system having a control apparatus in a preferred embodiment according to the present invention applicable to the continuously variable transmission shown in FIG. 1.

Figure 3A:
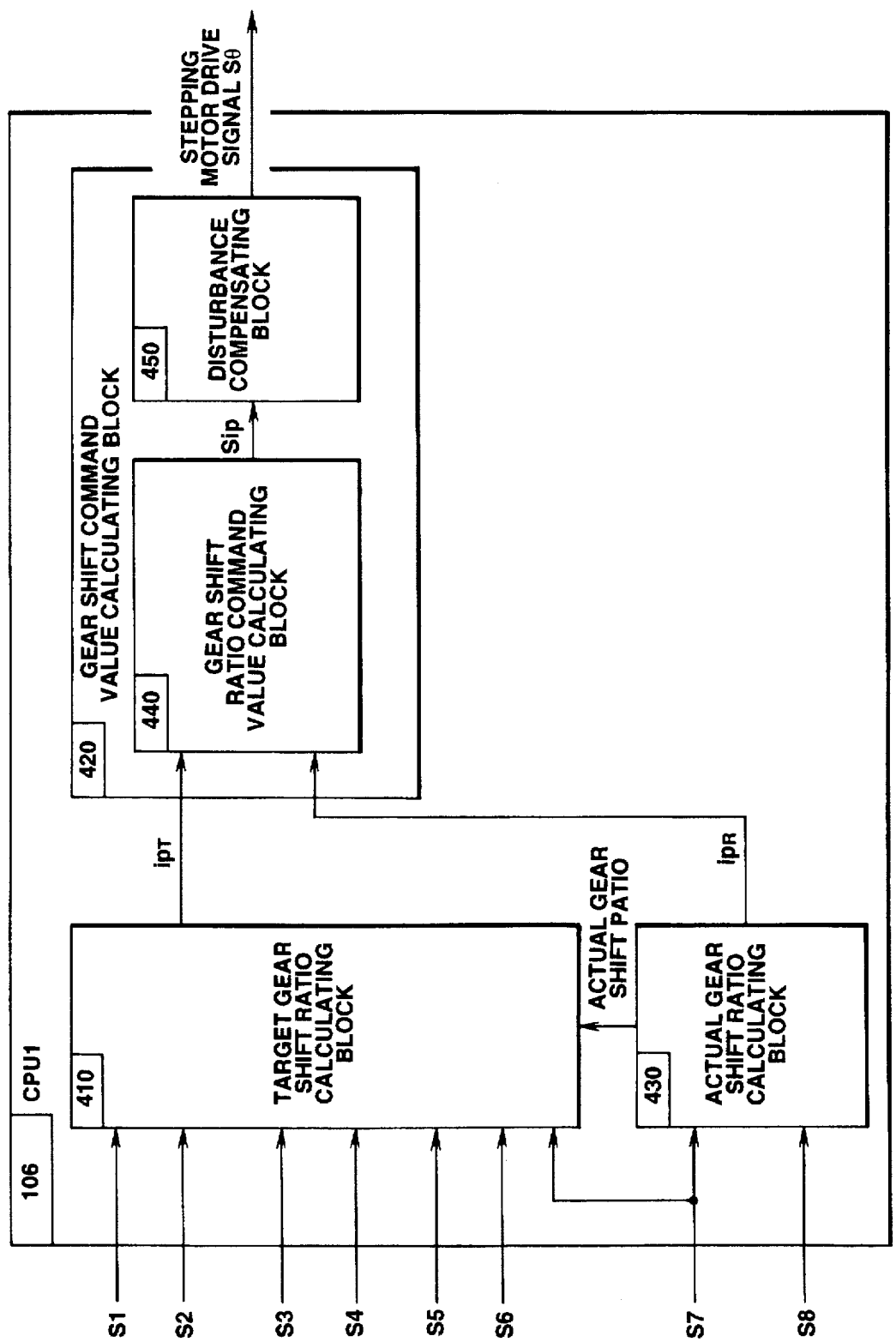

FIG. 3A is a functional block diagram of a control unit of a first CPU1 shown in FIG. 2.

Figure 3B:
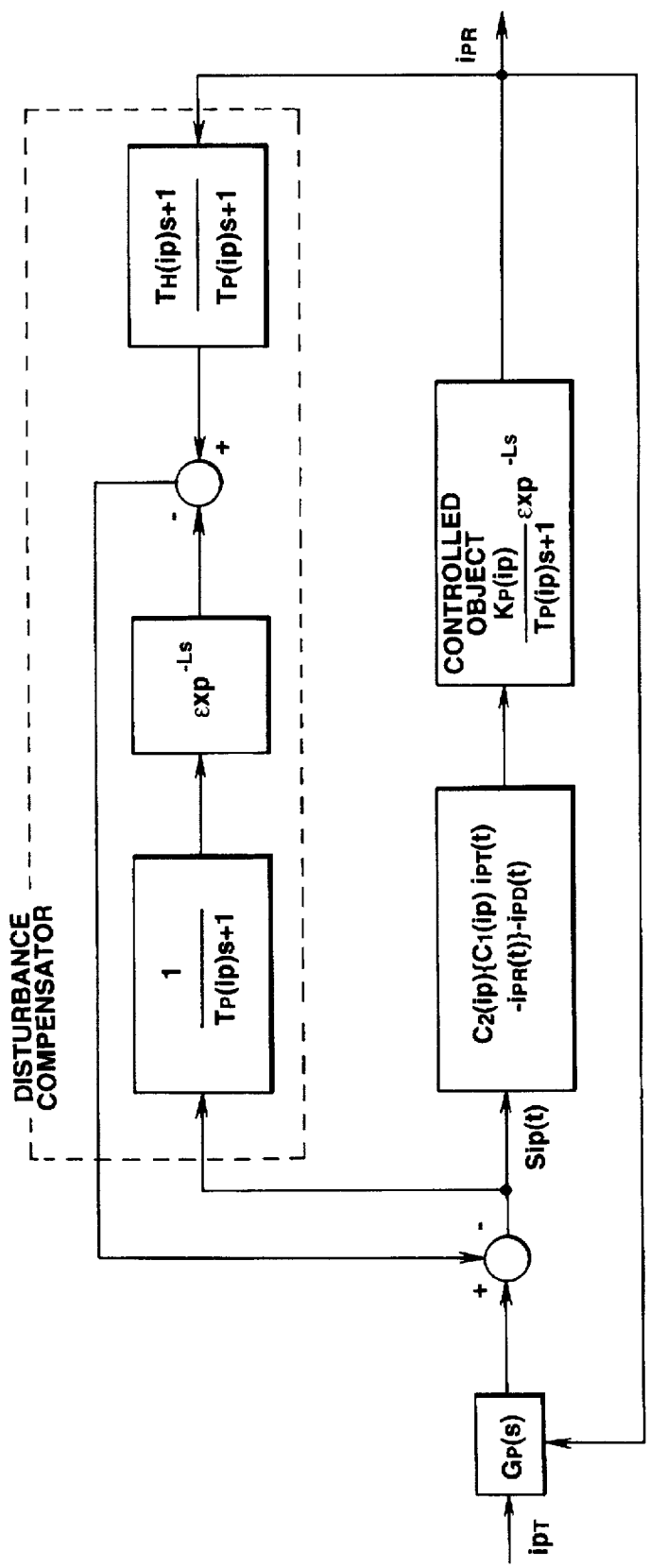

FIG. 3B is a hardware circuit block diagram of the control unit of CPU1 shown in FIG. 2 equivalent to the functional block diagram of FIG. 3A.

Figure 4:
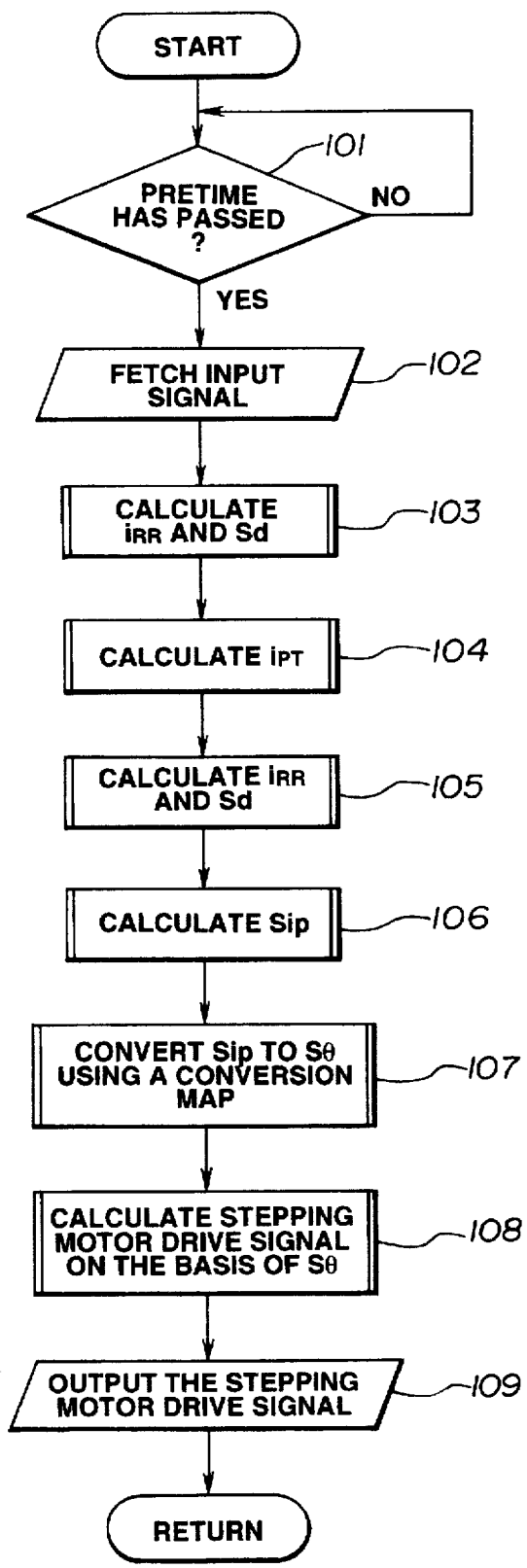

FIG. 4 is an operational flowchart of the control unit of the CPU1 executed in the embodiment shown in FIG. 2.

Figure 5:
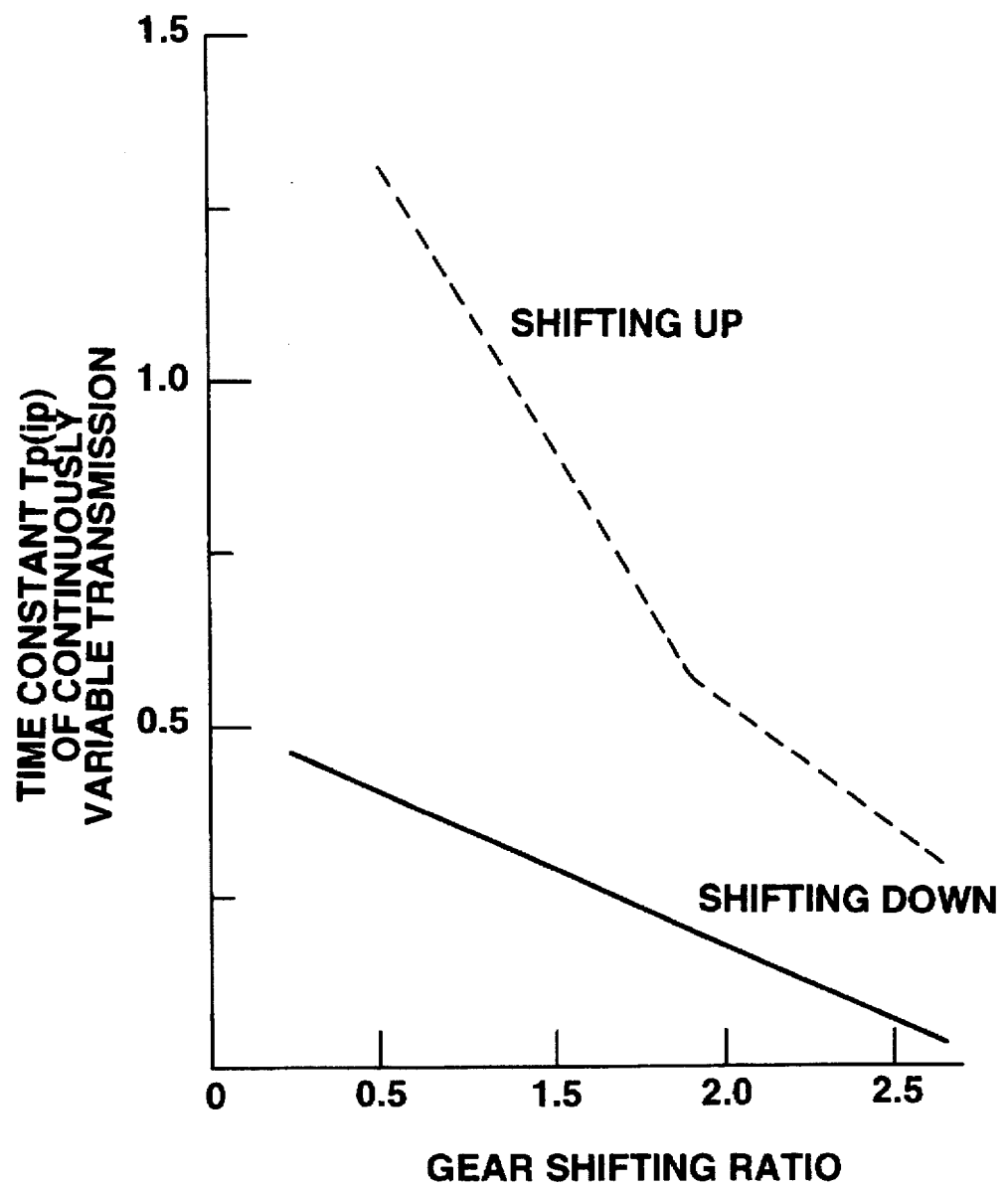

FIG. 5 is a characteristic graph representing a relationship between the gear shift ratio of the continuously variable transmission and a time constant $T_p(i_p)$ of the continuously variable transmission, the varying direction of the gear shift ratio as a parameter.

Figure 6:
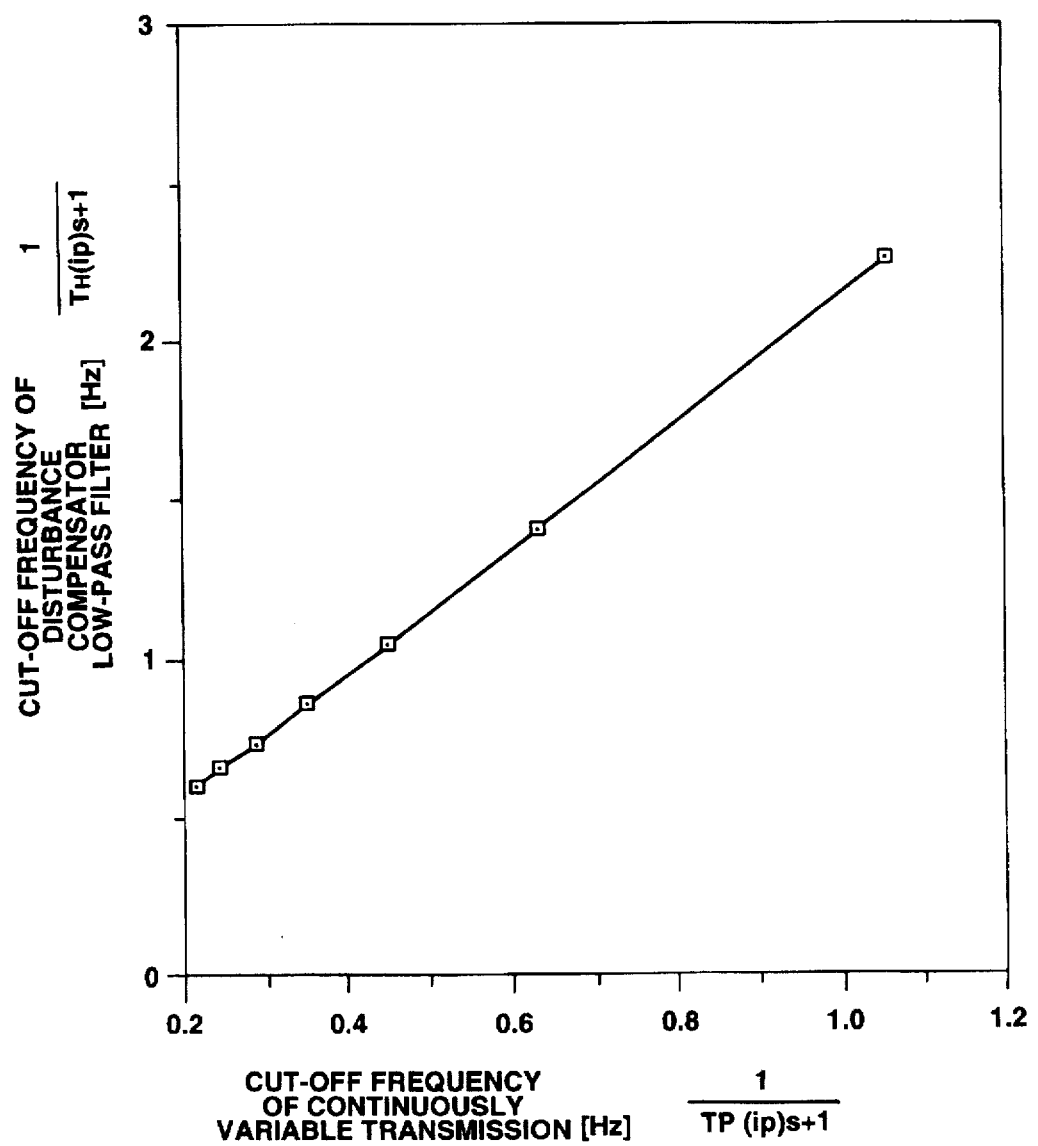

FIG. 6 is a characteristic graph representing a relationship between a cut-off frequency of the continuously variable transmission and a cut-off frequency of a part of a disturbance compensator.

Figure 7:
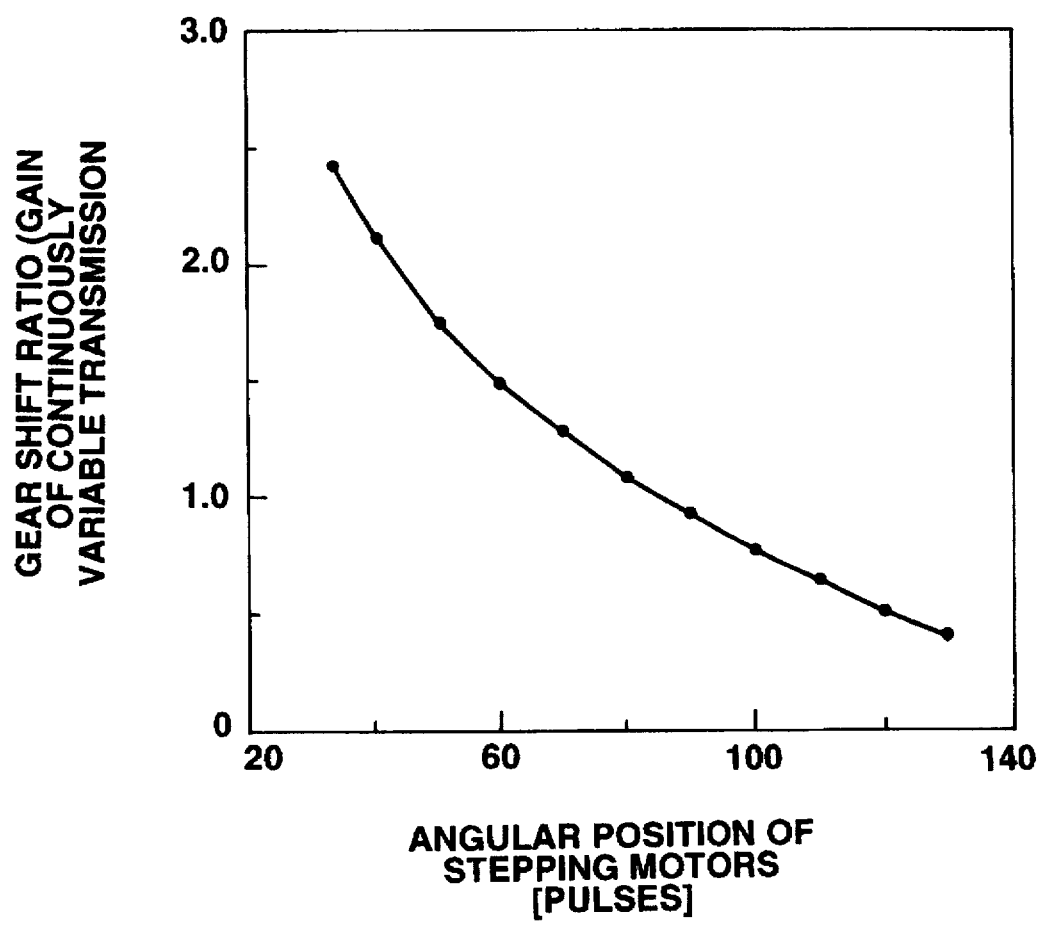

FIG. 7 is a characteristic graph representing a relationship between a gear shift ratio of the continuously variable transmission and an angular position of a stepping motor.

Figure 8:
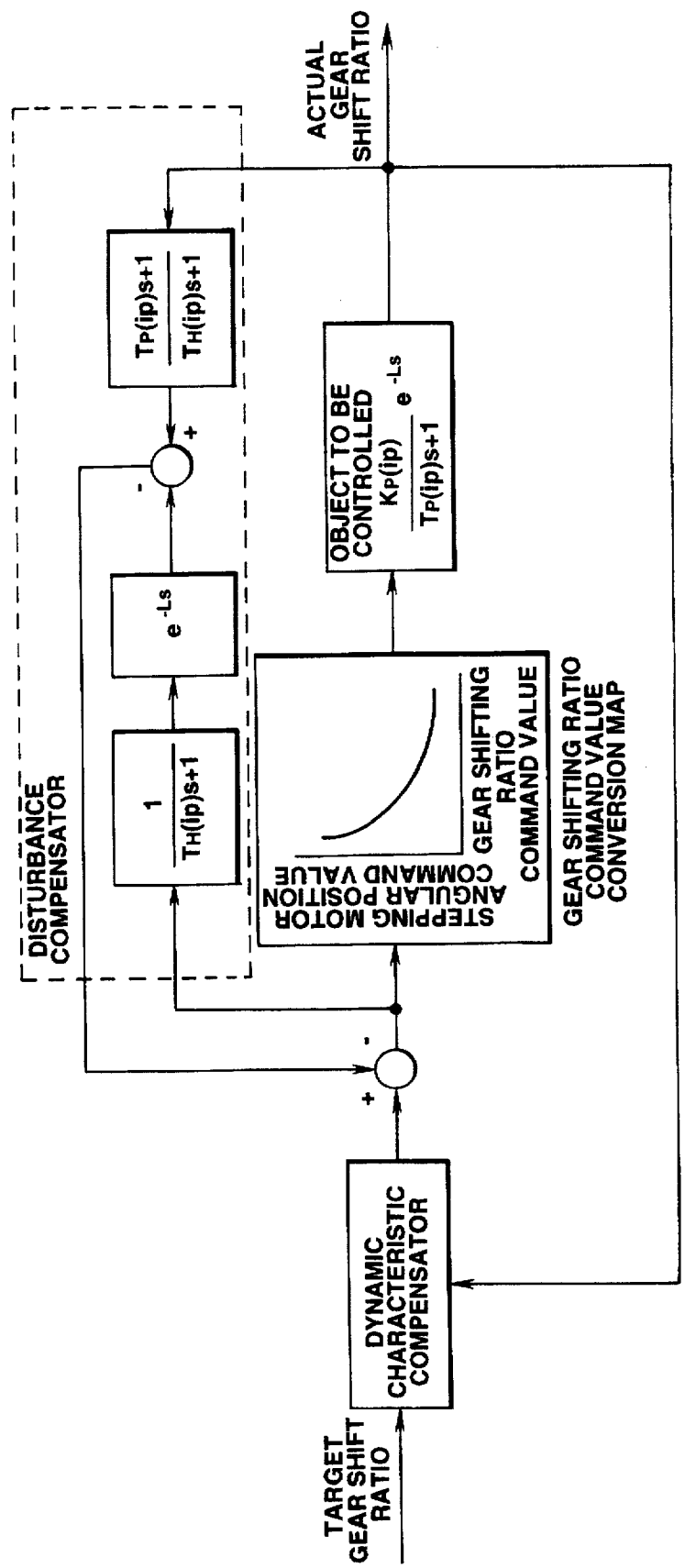

FIG. 8 is a hardware circuit block diagram of the control unit of CPU1 equivalently representing a first calculation method of a gear shift ratio command value as a modification of FIGS. 3A and 3B.

Figure 9:
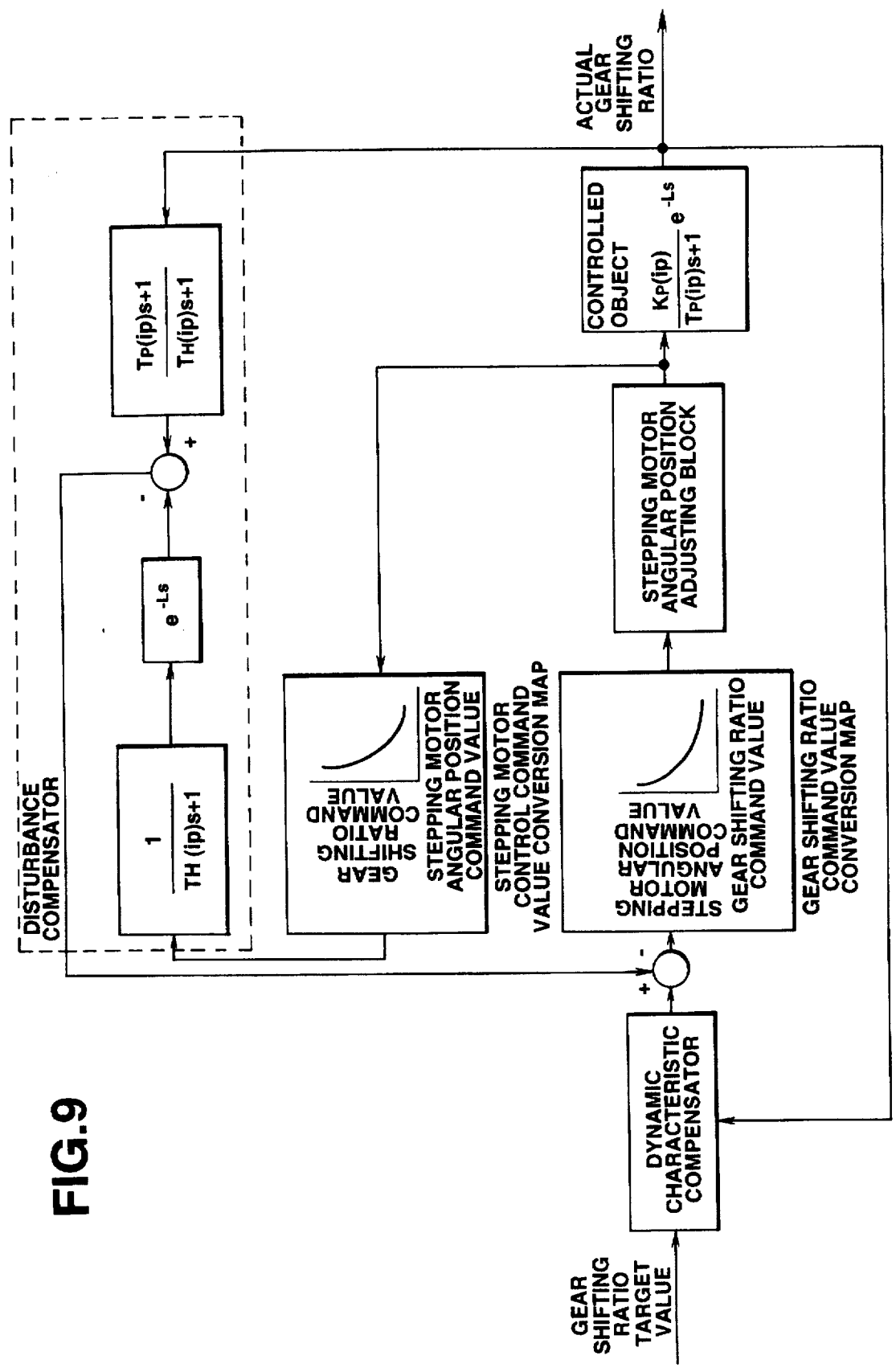

FIG. 9 is a hardware circuit block diagram of the control unit of CPU1 equivalently representing a second calculation method of the gear shift ratio command value as another modification of FIGS. 3A and 3B.

Figure 10:
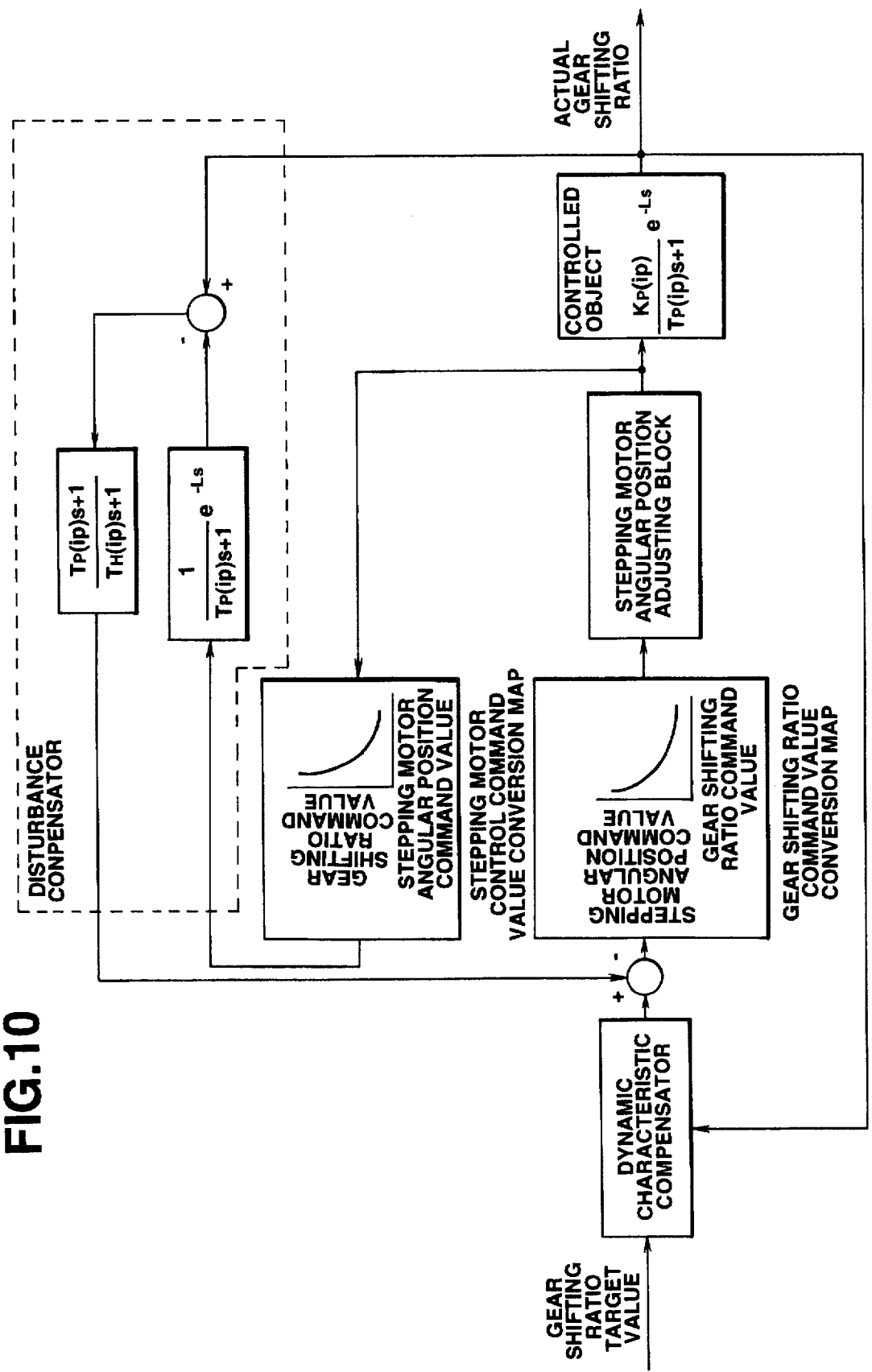

FIG. 10 is a hardware circuit block diagram of the control unit of CPU1 equivalently representing a third calculation method of the gear shift ratio command value as another modification of FIGS. 3A and 3B.

FIGS. 11A through 11D are first characteristic graphs representing results of simulations of gear shift ratio responses in the embodiment shown in FIG. 3A.

FIGS. 12A through 12D are second characteristic graphs representing results of simulations of the gear shift ratio responses in the embodiment shown in FIG. 3A.

FIGS. 13A and 13B are third characteristic graphs representing results of simulations of the gear shift ratio responses in the embodiment shown in FIG. 3A.

Figure 14:
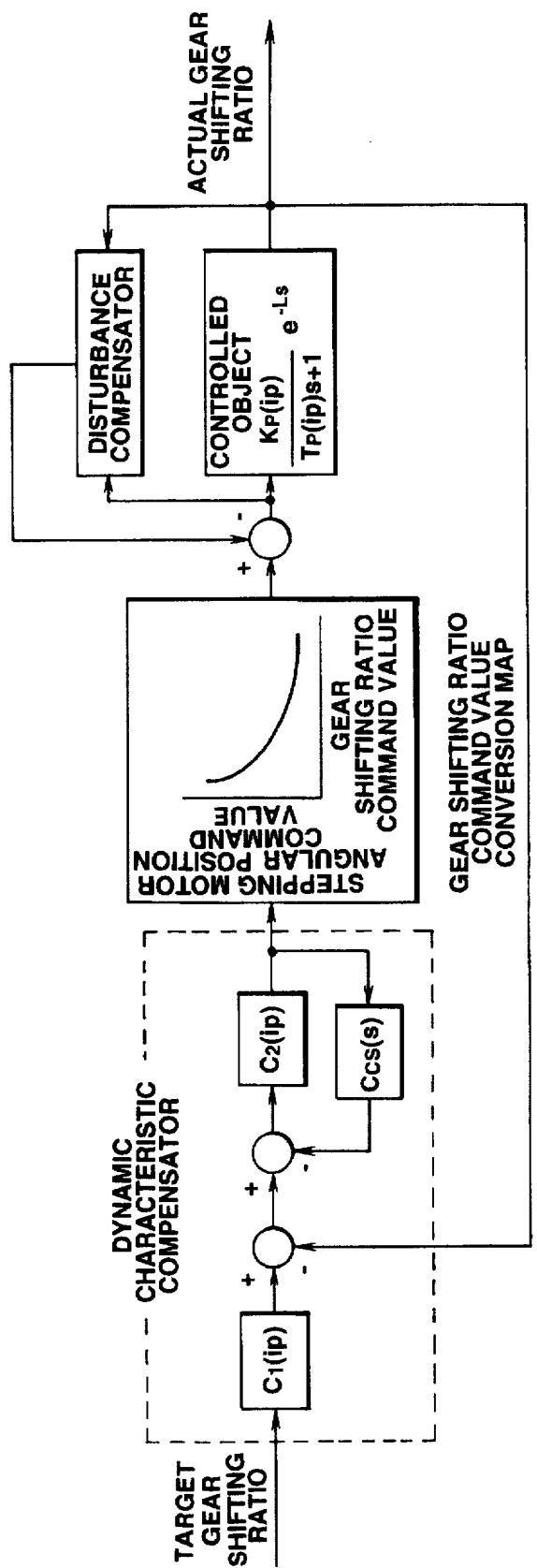

FIG. 14 is a hardware circuit block diagram of the control unit of the first CPU1 equivalently representing a fourth calculation method of the gear shift ratio command value as another modification of FIGS. 3A and 3B.

Figure 15:
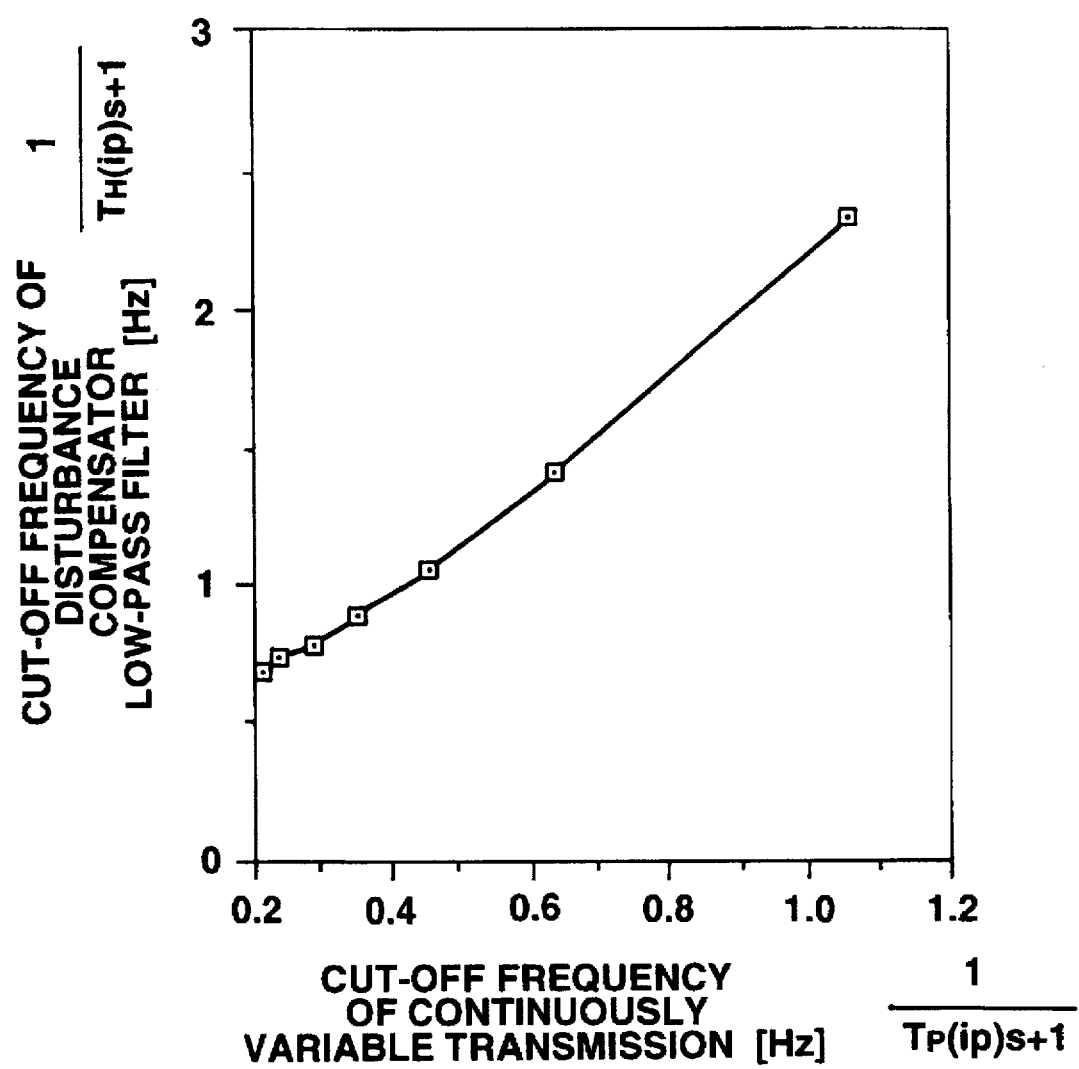

FIG. 15 is a characteristic graph representing a cut-off frequency in the content of the control unit of FIG. 14.

Figure 16:
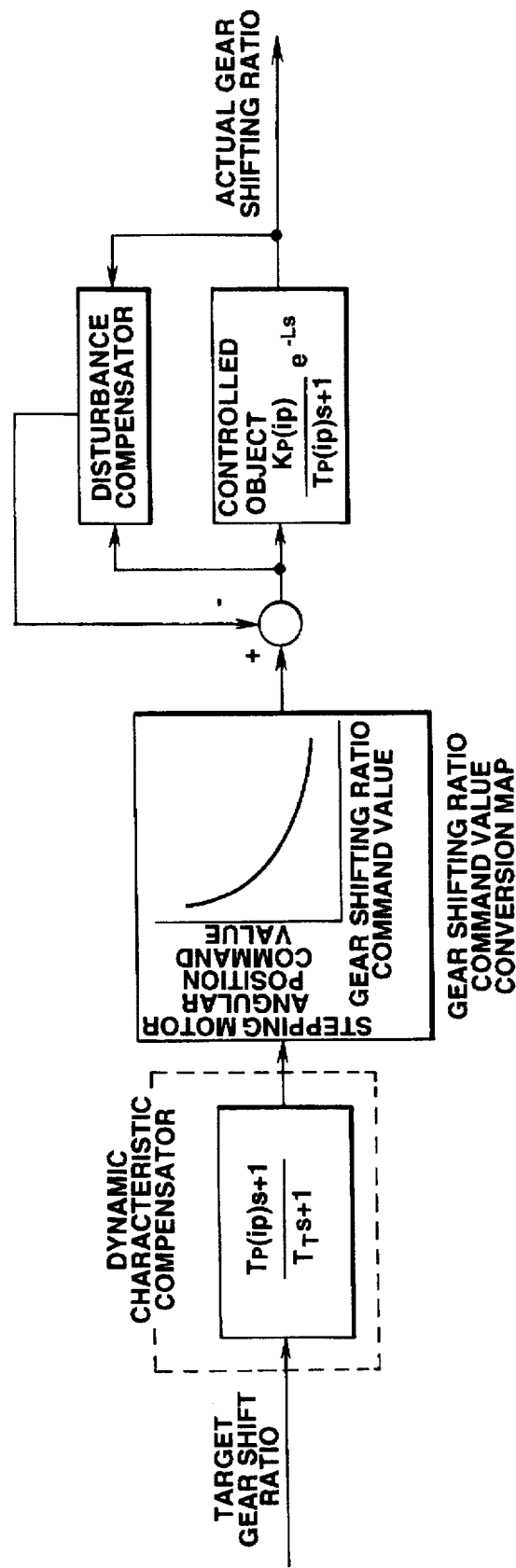

FIG. 16 is a hardware circuit block diagram of the control unit of CPU1 equivalently representing a fifth calculation method of the gear shift ratio command value.

Figure 17:
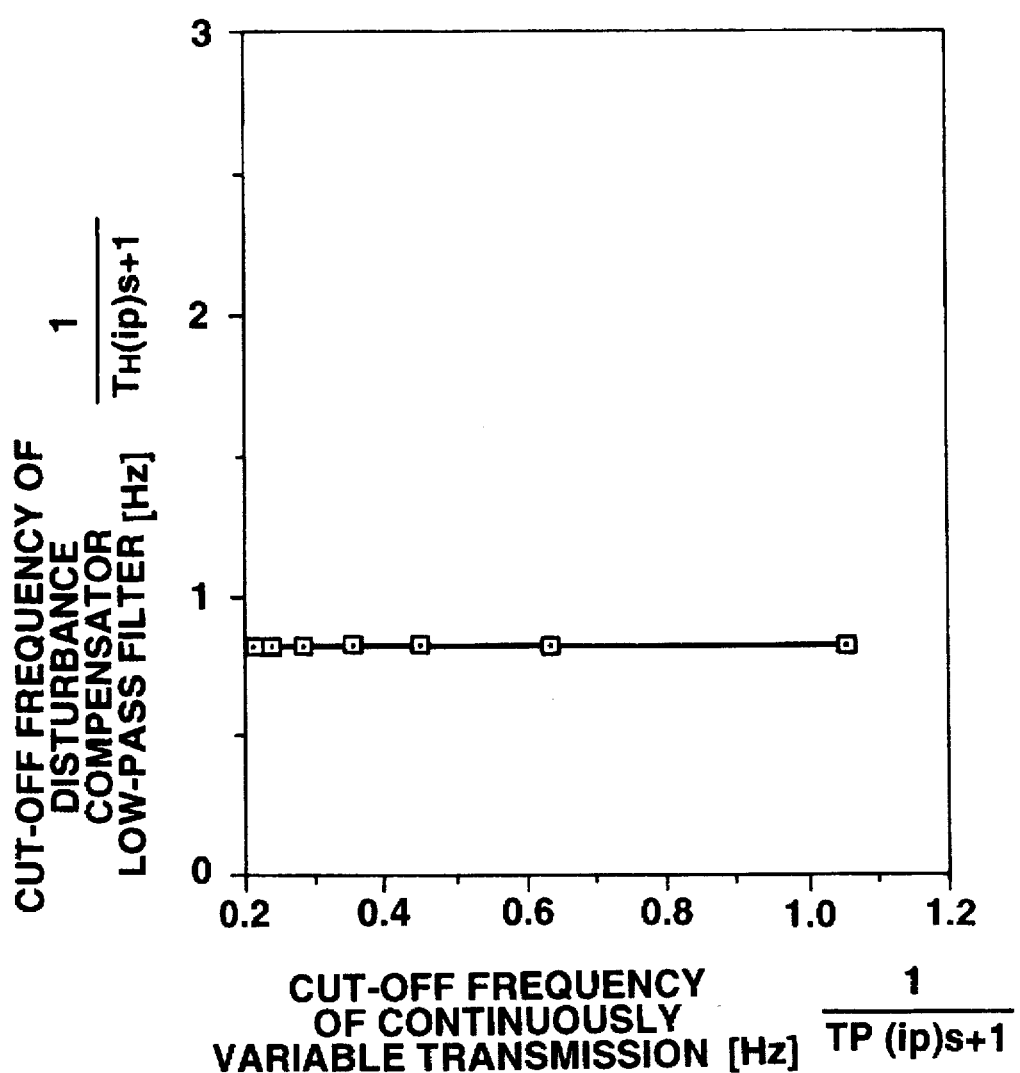

FIG. 17 is a characteristic graph representing a relationship between cut-off frequency of a disturbance compensator and of the continuously variable transmission in the case of FIG. 16.

Figure 18:
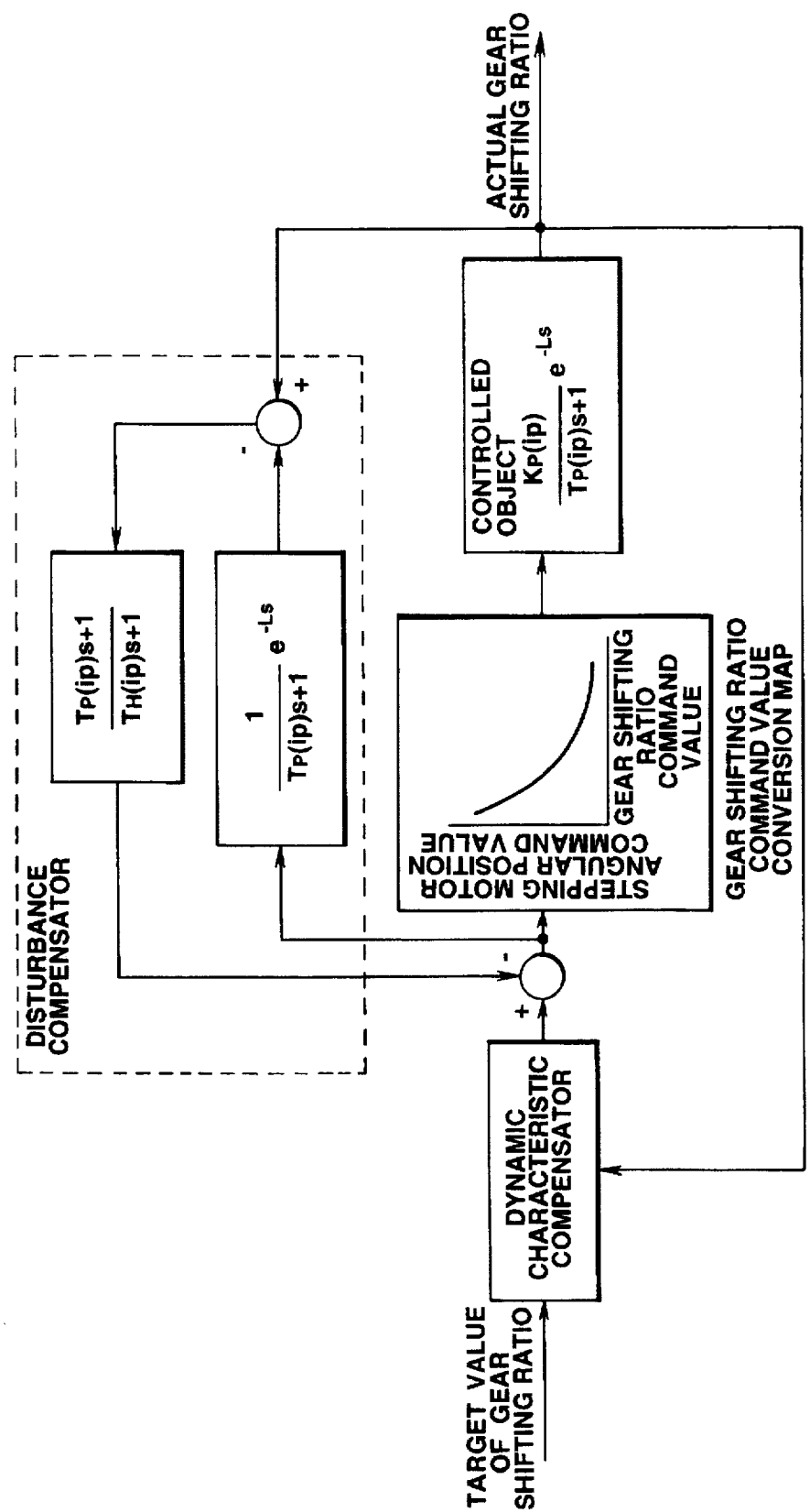

FIG. 18 is a hardware circuit block diagram equivalently representing a sixth calculation method of the gear shift ratio command value as further modification of FIGS. 3A and 3B.

BEST MODE FOR CARRYING OUT THE INVENTION

Reference will hereinafter be made to the drawings in order to facilitate a better understanding of the present invention.

FIG. 1 shows a longitudinally cross sectioned view of a whole continuously variable transmission (an automatic power transmission of a continuously variable transmission type) to which a control apparatus according to the present invention is applicable.

A torque converter 12 as a fluid-type power transmission device is linked to an engine output axle 10. The fluid-type power transmission device may be constituted by a fluid coupling or by an electromagnetic clutch in place of the torque converter 12.

The torque converter 12 is provided with a lock-up clutch 11. Hydraulic pressures in a torque converter chamber 12c and in a lock-up oil chamber 12d are controlled such that the hydraulic pressure in one of the chambers 12c or 12d is increased and, simultaneously, that in the other 12c or 12d is decreased thus a pump impeller 12a and a turbine runner 12b at its input side of the torque converter 12 being mechanically engaged to each other or separately disengaged from each other.

An output end of the torque converter 12 is linked to a rotation axle 13, the rotation axle 13 being linked to a forward (advancing)/rearward(reversing) switching mechanism 15. The forward/rearward switching mechanism 15 includes: a planetary gear mechanism 19, a forward (advancing) clutch 40, and a rearward (reversing) brake 50.

An output end of the planetary gear mechanism 19 is linked to a drive axle 14 coaxially fitted onto an outside periphery of the rotation axle 13. The drive axle 14 is provided with a drive pulley 16 of the continuously variable transmission 17. The continuously variable transmission 17 includes: the drive pulley 16, a driven pulley 26, and a V (V-shaped) belt 24 which transmits a rotation force (torque) applied to the drive pulley 16 to the driven pulley 26. The drive pulley 16 includes: a fixed (stationary), truncated shaped cone plate 18 which integrally rotates together with the drive axle 14; and a movable, truncated cone shaped plate 22 which is opposed to the fixed truncated cone plate 18 to form a letter V-shaped pulley groove together with the fixed plate 18 and which is movable in an axial direction of the drive axle 14 according to the hydraulic pressure acted upon a drive pulley cylinder chamber 20.

The drive pulley cylinder chamber 20 includes: a chamber 20a and another chamber 20b, the drive pulley cylinder chamber 20 having a larger pressure receiving area than a driven pulley cylinder chamber 32 as will be described later.

The driven pulley 26 is attached on the driven pulley axle 28. The driven pulley 26 includes: the fixed truncated cone shaped plate 30 which integrally rotates with the driven axle 28; and the movable, truncated cone shaped plate 34 which is movable in the axial direction of the driven axle 28 by means of the hydraulic pressure acted upon the driven pulley cylinder chamber 32. A drive gear 46 is fixed on the driven axle 28. The drive gear 46 is engaged with an idler gear 48 on an idler axle 52. The pinion gear 54 installed on the idler axle 52 is engaged with a final gear 44. The final gear 44 drives road wheels (not shown) of an automotive vehicle in which the whole continuously variable transmission shown in FIG. 1 is mounted via a propeller shaft or drive shaft via a differential device 56.

The rotating force (torque) inputted to the whole continuously variable transmission (shown in FIG. 1) from the engine output axle 10 is transmitted to the forward/rearward switching mechanism 15 via the torque converter 12 and the rotation axle 13. With the forward clutch 40 engaged and the rearward brake 50 released, the rotation force (torque) of the rotation axle 13 is transmitted in the same rotational direction to the drive axle 14 of the continuously variable transmission 17 via the planetary gear mechanism 19 which is under an integral rotation state. On the other hand, with the forward clutch 40 released and the rearward brake 50 engaged, an action of the planetary gear mechanism 19 permits the rotating force of the rotation axle 13 to be transmitted to the drive axle 14 with the direction of the rotating force (torque) reversed.

The rotation force (torque) on the drive axle 14 is transmitted to the differential device 56 via the drive pulley 16, the V belt 24, the driven pulley 26, the driven axle 28, the drive gear 46, an idler gear 48, an idler axle 52, a pinion gear 54, and a final gear 44.

If both of the forward clutch 40 and rearward brake 50 are released, the power transmission mechanism described above is in a neutral state.

When the movable, truncated cone shaped plate 22 of the drive pulley 16 and the movable, truncated cone shaped plate 34 of the driven pulley 26 are moved in the axial directions of the drive axle 14 and of the driven axle 28, respectively, so that a radius of the movable, truncated cone shaped plate 22 from a center thereof to a position at which the movable plate 22 is contacted with the V belt 24 (called, radius of the contacted position of the movable plate 22 with the V belt 24) and a radius of the movable, truncated cone shaped plate 34 from a center thereof to a position at which the movable plate 34 is contacted with the V belt 24 (called, radius of the contacted position of the movable plate 34 with the V belt 24 are varied. Thus, a rotation ratio, in other words, a gear shift ratio (speed reduction ratio) between the drive pulley 16 and the driven pulley 26 can be varied via the V belt 24.

For example, if a width of the V-shaped groove of the drive pulley 16 formed with the V belt 24 is expanded (increased) and the width of the V-shaped groove of the driven pulley 26 formed with the V belt is narrowed, the radius of the position contacting the V belt 24 of the drive pulley 16 is reduced and the radius of the position contacting the V belt 24 of the driven pulley 26 is decreased (as viewed from a left-handed portion of the V belt 24 shown in FIG. 1 so that a large gear shift ratio can be achieved. If the movable, truncated cone shaped plates 22 and 34 are moved in mutually opposite directions, a relatively small gear shift ratio is, on the contrary, obtained as viewed from a right-handed portion of the V belt 24 of FIG. 1.

Such a control that each width of the V-shaped grooves of the drive pulley 16 and the driven pulley 26 is varied is carried out according to the hydraulic pressure applied to the drive pulley cylinder chamber 20 (20a, 20b) and applied to the a drive pulley cylinder chamber 32 via a control system having a control apparatus as described below.

FIG. 2 shows a schematic circuit block diagram of a whole control system having the control apparatus for controlling the gear shift ratio of the continuously variable transmission shown in FIG. 1.

The whole control system includes: a) an electronic control portion such as a microcomputer and b) a hydraulic pressure control portion 102 having various kinds of hydraulic pressure control valves.

The control apparatus for controlling the gear shift ratio of the continuously variable transmission is mainly constituted by an electronic control portion 101 and a hydraulic pressure control portion 102.

The electronic control portion 101 includes: a Central calculating block 101A which carries out a control arithmetic processing and which includes three CPUs of CPU1, CPU2, and CPU3; an Input Port 101B which converts analog signals indicating various drive condition signals from the engine and the vehicle into corresponding digital values so as to be processed in the Central calculating block 101B; and an Output Port 111 which outputs various kinds of signals to control the hydraulic pressure and other controlled parameters on the basis of the control signals from the Central calculating block 101A.

The input port 101B receives a coolant temperature indicative signal S1, throttle valve opening angle indicative signal S2, engine rotation signal ABS (Antilock (Antiskid) Brake System) operation indicative signal S4 from an ABS control unit 104, a brake signal S5 which is issued when the vehicular braking apparatus is operated, a selector position signal S6 indicating a selected (gear range) position of a selector lever 105 and issued from an inhibitor switch of the transmission, a rotation speed signal S7 (turbine rotation speed signal) of the drive pulley 16, and a rotation speed signal S8 of the driven pulley 26 (vehicle speed signal). These sensor and switch signals are supplied to the Central processing block 101A according to its necessity of processing.

The Central processing block 101A includes: the first CPU 106 (denoted by CPU1) used to control the gear shift ratio; a second CPU 107 (denoted by CPU2) used to control a line pressure control portion 107 which controls a line pressure in the continuously variable transmission 17; and a third CPU 108 (denoted by CPU3) used to control an engagement or release of the lock-up clutch 11.

These CPUs calculate control signals using the required predetermined signals from among the various kinds of the sensor and switch signals and drive a stepping motor drive circuit 109, a line pressure solenoid drive circuit 110, a lock-up solenoid drive circuit 111, respectively, these circuits constituting the output block (port) 101C. Consequently, the gear shift ratio is controlled by the first CPU1, the line pressure is controlled by the second CPU2, and the lock-up clutch 11 of the continuously variable transmission 17 is controlled by the third CPU3.

In details, the first CPU1 106 outputs the control signal to the stepping motor drive circuit 109 so that the gear shift ratio is carried out in accordance with a predetermined pattern previously determined according to an engine load such as the opening angle of the throttle valve, revolution speed, and vehicle speed.

The stepping motor drive circuit 109 drives a stepping motor 113 linked to the gear shift control valve 112 in the hydraulic control portion 102 on the basis of the control signal from the first CPU1 (106). The stepping motor 113 corresponds to a gear shift ratio varying mechanism.

The stepping motor 113 drives the gear shift ratio control valve 112 such that the continuously variable transmission 17 provides the gear shift ratio according to a content of the drive signal from the stepping motor drive circuit 109. Correspondingly, the line pressure supplied to the drive pulley cylinder chamber 20 and the driven pulley cylinder chamber 32 (refer to FIG. 1) is increased or decreased such that the hydraulic pressure in one of both cylinder chambers 20 and 32 is increased and that of the other cylinder chamber is decreased.

A displacement of the drive pulley 16, i.e., an actual gear shift ratio is fedback to the gear shift control valve 112 via a link 114. When the continuously variable transmission reaches a target gear shift ratio which approximately corresponds to a stepped (angular) position of the stepping motor 113 according to the drive signal thereinto, an oil (hydraulic)

distribution to the respective pulley cylinder chambers 20 and 32 is made constant so as to stabilize the actual gear shift ratio at the target gear shift ratio.

On the other hand, while the gear shift ratio of the continuously variable transmission 17 is controlled, with the line pressure supplied to each of the drive and driven pulleys 16 and 26 excessively small, frictional forces on the pulleys 16 and 26 against the V belt 24 becomes lack so that slips occur thereon. On the contrary, while the gear shift ratio of the continuously variable transmission 17 is controlled, with the line pressure supplied to each pulley 16 and 26 excessively large, the frictional forces become excessively large. Hence, in either of the cases, an ill effect of excessively weak or strong frictional forces is given to the vehicular fuel consumption and vehicular performance.

Therefore, in order to carry out an appropriate power transmission according to the vehicle driving condition, the second CPU2 107 controls the line pressure supplied to each pulley 16 and 26 via the line pressure solenoid drive circuit 110.

That is to say, the line pressure solenoid drive circuit 110 drives to change a position of the line pressure solenoid 115 of the hydraulic pressure control portion 102 according to the control signal derived from the second CPU2 107. Thus, the line pressure solenoid 115 accordingly adjusts the hydraulic pressure from an oil pressure pump (not shown) to provide a target, appropriate hydraulic pressure via a modifier (pressure regulator valve) 116 and a regulator valve 117 (constant pressure valve) 117, the adjusted hydraulic pressure being supplied to the gear shift control valve 112 and to each of the drive and driven pulleys 16 and 26.

In addition, the lock-up control portion 108, namely, the third CPU3 carries out the hydraulic control such that the lock-up clutch 11 is clutched when the vehicle speed is equal to or above a predetermined value and is released when the vehicle speed is below the predetermined value.

That is to say, the third CPU3 (108) drives the lock-up solenoid 118 in the hydraulic control block 102 via a lock-up solenoid drive circuit 111 according to the vehicle speed from the rotation speed signal S8 of the driven pulley 26 so that a lock-up control valve 119 is switched. In this case, the lock-up control valve 119 switches between two systems, namely, a system in which the hydraulic pressure from the hydraulic pressure (oil pressure) pump is supplied to the converter chamber 12c as an apply pressure to clutch the lock-up clutch 11 and a system in which the hydraulic pressure is supplied to the lock-up oil chamber 12c as a release pressure to release the lock-up clutch 11. In details, when the lock-up clutch 11 is to be connected (to be clutched), the apply pressure is supplied to the converter chamber 12c while the lock-up oil chamber 12d is released. When the lock-up clutch 11 is to be released, the release pressure is supplied to the lock-up oil chamber 12d and the converter chamber 12c is released.

The example of the automatic transmission of the continuously variable transmission type and the whole control system to which the present invention is applicable has been described with reference to FIG. 1 and FIG. 2.

The control apparatus for the continuously variable transmission according to the present invention sets a gear shift ratio command value so as to achieve a desired gear shift ratio response corresponding to a natural dynamic characteristic inherent to the continuously variable transmission to which the control apparatus according to the present invention is applicable and/or corresponding to the operating parameter variation.

FIG. 3A shows a functional block diagram of an example of the first CPU1 106 in order to carry out such a gear shift ratio control as described above.

In FIG. 3A, a target gear shift ratio calculating block 410 calculates a target gear shift ratio $i_{pT}$ which corresponds to the vehicular driving condition including an engine driving condition on the basis of the various vehicle driving condition indicative signals such as the engine throttle valve opening angle signal S2 and the engine rotation signal S3.

A gear shift ratio command value output block 420 outputs a finally derived gear shift ratio on the basis of a result of comparison between the target gear shift ratio $i_{pT}$ and an actual gear shift ratio $i_{pR}$ as a stepping motor drive signal S0. An actual gear shift ratio calculating block 430 calculates the actual gear shift ratio $i_{pR}$ of the continuously variable transmission from the rotation speed signal S7 of the drive pulley 16 and the rotation speed signal S8 of the driven pulley 28. The gear shift ratio command value calculating block 420 includes: a gear shift ratio calculating block 440 which calculates the gear shift ratio command value $Si_p$ so as to vary the gear shift ratio toward the target gear shift ratio $i_{pT}$ with a predetermined characteristic with the actual gear shift ratio $i_{pR}$ fedback thereinto; and a disturbance compensator 450 which carries out a disturbance compensation for the result of calculation of the gear shift ratio command value, converts its disturbance compensation output into the angular (stepped) position of the stepping motor 113 and outputs the angular position of the stepping motor 113 as the drive signal of S0.

FIG. 4 shows an operational flowchart for explaining a control content of the gear shift ratio control block (the first CPU1) 106 shown in FIG. 2.

In the gear shift ratio control, a wait time is set in order to carry out the gear shift ratio control for each predetermined control period of time. The actual gear shift ratio $i_{pR}$ is calculated on the basis of the input axle and output axle revolution speed signals S7 and S8 of the continuously variable transmission 17 described above. On the basis of this actual gear shift ratio $i_{pR}$ and the previously calculated value at the previous control period, a gear shift ratio direction of $i_{pR}$ indicating whether the gear shift ratio is being varied in the gear shift ratio increase direction or in the gear ratio decrease direction is set (refer to steps of 101 through 108).

Next, the first CPU1 calculates the target gear shift ratio $i_{pT}$ according to the vehicle drive condition signals.

Next, the dynamic characteristic Gp(s) for each gear shift ratio $i_p$ and for each gear shift ratio varying direction Sd previously derived through an experiment for each model of the continuously variable transmission shown in FIG. 1 is derived from the following equation (1).

$$Gp(s) = Kp(i_p) \times \exp^{-Ls}/\{Tp(i_p)s+1\} \quad (1),$$

wherein $K_p(i_p)$: a gain of the continuously variable transmission to which the control apparatus is applicable, $T_p(i_p)$: a time constant of the continuously variable transmission determined for each gear shift ratio and for each gear shift ratio varying direction (refer to FIG. 5), L denotes a dead time, s denotes a differential operator ($s=\sigma+j\omega$ and corresponds to a Laplace transform operation), and t denotes a time (the present time within the predetermined control period of the first CPU1 ).

On the other hand, the disturbance compensator 450 is so designed, with the dynamic characteristic of the continuously variable transmission expressed in the above equation (1) as a reference model, that this reference model eliminates a parameter variation such as a viscosity variation of the working oil in the continuously variable transmission 17 and a deviation of the dynamic characteristic of the continuously variable transmission due to a mass production of the continuously variable transmission and a kind of turbulence due to an external disturbance.

In this case, the external disturbance compensator output $i_{pD}$ is derived from the following equation (2) with the gear shift ratio command value $Si_p$ and the actual gear shift ratio $i_{pR}$ as input parameters.

$$i_{pD}(t)=\{T_H(i_p)s+1\}i_{pR}(t)/\{T_p(i_p)s+1\}-\exp^{-Ls}\cdot Si_p(t)/\{T_H(i_p)s+1\} \quad (2).$$

In the equation (2), $T_H(i_p)$ denotes a cut-off frequency of a low-pass filter of the external disturbance compensation block 450 (disturbance compensator) and is calculated so that the dynamic characteristic (time constant and dead time) of the continuously variable transmission 17 and a stability of the control apparatus are satisfied (refer to FIG. 6).

Then, the gear shift ratio command value calculating block 440 derives a dynamic characteristic (gear shift ratio response) $G_T(s)$ which the designer desires to achieve from the following equation (3) and, thus, the gear shift ratio command value $Si_p$ is derived using the following equation (4). (Refer to steps of 104 through 106 of FIG. 4).

$$G_T(s)=\exp^{-Ls}/(T_Ts+1) \quad (3)$$

$$Si_p(t)=C_2(i_p)\{C_1(i_p)\times i_{pT}(t)-i_{pR}(t)\}-i_{pD}(t) \quad (4),$$

In the equation (4), $$C_1(i_p)=T_p(i_p)/\{T_p(i_p)-T_T\} \quad (5),$$

and $$C_2(i_p)=\{T_T/T_p(i_p)\}-1 \quad (6),$$

and $T_T$ denotes a time constant corresponding to a designed target gear shift ratio response, $i_{pT}(t)$ denotes a target gear shift ratio at a time t, and $i_{pR}(t)$ denotes an actual gear shift ratio at the time t.

The calculated gear shift ratio command value $Si_p$ reflects the dynamic characteristic for each gear shift ratio and each gear shift ratio varying direction of the continuously variable transmission. That is to say, for an arbitrary gear shift ratio and an arbitrary gear shift ratio direction, the gear shift ration command value $Si_p$ represents the gear shift ratio response as an initially desired. It is, however, noted that since the angular position of the stepping motor 113 and the (real) gear shift ratio of the continuously variable transmission have generally no proportional relationship to each other, in this case, the drive signal Sθ (the angular position of the stepping motor 113) is converted into a value corresponding to the gear shift ratio command value $Si_p$ so that the above-described proportional relationship is established and the converted value is output to the stepping motor 113. (Refer to steps 107 through 109).

The equations of (7) through (9) described below indicate formulae for the above-described conversion. A conversion quantity (variable) of the gear shift ratio command value $Si_p$ is determined so that the proportional relationship between the gear shift ratio command value to the gear shift ratio control valve 112 and the actual gear shift ratio $i_p$ is established on the basis of the relationship between a movement variable Ds of the width of the V shaped groove at the drive pulley 16 corresponding to the angular position of the stepping motor and the gear shift ratio $i_p$.

$$r_i=\{Ds/2\tan(\beta)\}+r_{io} \quad (7)$$

$$r_o=[2r_i-\pi Dc+\{(2r_i-\pi Dc)^2-4(r_i^2+Dcr_i+Dc(2Dc-L_B))\}^{1/2}]/2 \quad (8)$$

$$i_p=r_o/r_i \quad (9)$$

In the equation, $r_i$ denotes the radius of the V belt contacting portion of the drive pulley 16, $r_{io}$ denotes a minimum radius of the drive pulley 16, Dc denotes an interaxle distance between the drive pulley 16 and driven pulley 26, $L_B$ denotes a circumferential length of the V-shaped belt 24, and β denotes a sheave angle of each pulley.

FIG. 3B shows a hardware equivalent circuit of the first CPU1 equivalent to that of FIG. 3A to control the gear shift ratio of the continuously variable transmission.

It is noted that, in FIG. 3B, each block circuit has a transfer function expressed in a corresponding one of the blocks and a controlled object denotes the gear shift ratio varying mechanism.

Since specification (requirements) data of the continuously variable transmission are already known, the conversion variable based on the conversion formulae of (7) through (9) is not needed to be calculated whenever the control of the gear shift ratio for each control period is executed but the result of the calculation based on the formulae of (7) through (9) may be mapped as shown in FIG. 7. Alternatively, the first CPU1 (106) may read the mapped conversion variable obtained on the basis of the actual measurement result. Consequently, a calculation load that the first CPU1 needs to be executed can be relieved.

FIGS. 8, 9, and 10 show circuit block diagrams of hardware equivalent circuits of the first CPU1.

In FIGS. 8, 9, 10, the conversion map representing the relationship between the stepping motor angular position Sθ and the gear shift ratio command value $Si_p$ is used in place of the conversion variable based on the conversion formulae of (7), (8), and (9).

In FIGS. 9 and 10, the gear shift ratio command value $Si_p$ to be input to the disturbance compensation block 450 is derived from the output signal of Sθ output from a motor angular position adjusting block using a inverted map of the conversion map shown in FIG. 8.

Figure 12C:
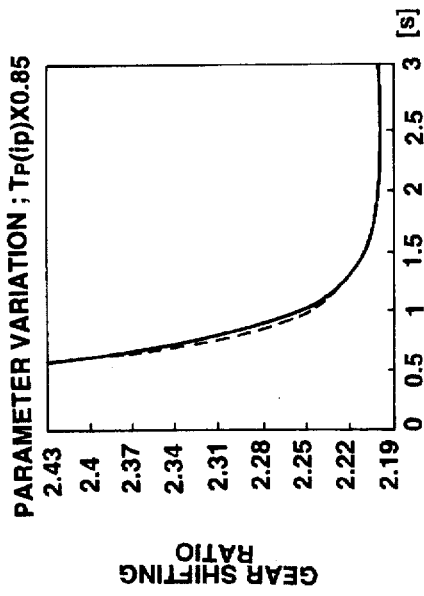
Figure 12D:
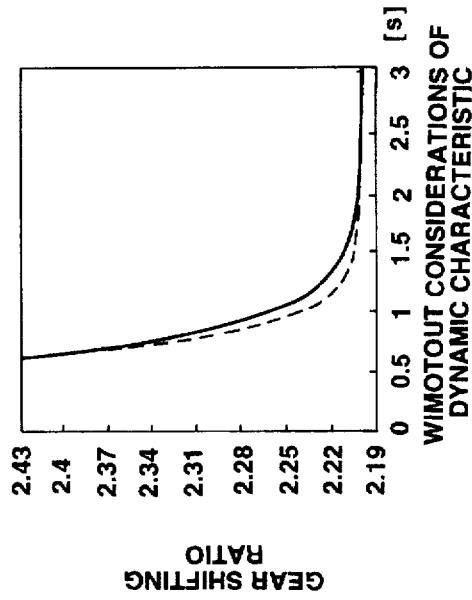
Figure 12A:
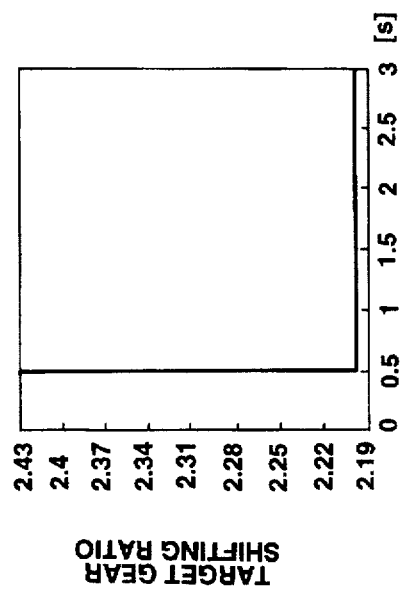
Figure 12B:
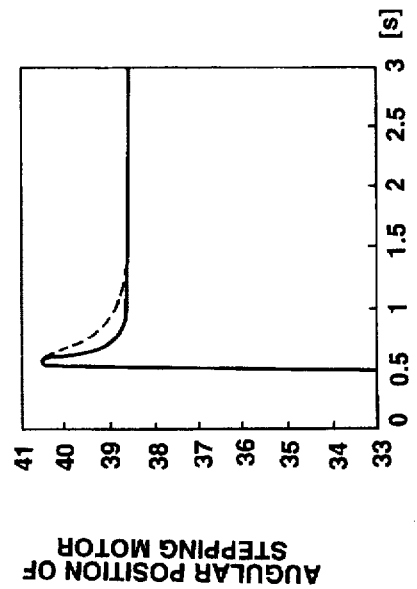

FIGS. 11A, 11B, 11C, 11D, 12A, 12B, 12C, and 12D show simulation results of the control apparatus equivalently shown in FIG. 8. The control apparatus was designed to achieve the target gear shift ratio response as $G_T(s)=\exp(-0.09s)/(0.3s+1)$. In FIGS. 11B, and 12B, dotted lines denote the characteristic graphs with no dynamic characteristic and the solid lines denote the characteristic graphs when the control apparatus of FIG. 8 was simulated. In FIGS. 11C, 11D, 12C, and 12D, the solid line denotes the characteristic graphs of the actual gear shift response of the control apparatus which was simulated as described above and the dotted line denotes the characteristic graphs of the gear shift response which the designer was desired to achieve.

It is noted that FIGS. 12A through 12D show a case where the operating parameter variation due to the variation in the oil viscosity occurs (suppose that the time constant $T_p(i_p)$ was reduced by 15%). In this case, the target gear shift ratio response was accurately obtained.

Although it is possible to achieve the gear shift ratio response that the designer has desired only by calculating the control constant on the gear shift ratio control on the basis of the dynamic characteristic determined for each gear shift ratio without influence of the gear shift ratio position and operating variable of gear shift ratio, the target gear shift ratio response that the designer has desired cannot always be obtained since the external disturbance such as the load variation of the continuously variable transmission occurs, the variation in the oil viscosity of the hydraulic pressure mechanism which creates a pressing force on each pulley occurs due to an environment temperature and/or its deterioration, and, furthermore, a difference in the characteristics of the continuously variable transmission for each product of the continuously variable transmission itself occurs due to a machining accuracy and assembly accuracy of each product of the continuously variable transmission. However, the control apparatus according to the present invention can exhibit the response characteristic of the gear shift ratio that the designer has desired to achieve even if such a operating parameter variation as described above occurs.

In a case where such a gear shift ratio operation as exceeding a parameter identification of the gear shift ratio varying mechanism to control the opening angle of the gear shift ratio control valve provides such a nonlinear operation characteristic as a slow dynamic characteristic, the disturbance compensator is acted upon so as to compensate for the nonlinear operation characteristic. Thus, although the actual gear shift ratio can be approached to the parameter identified dynamic characteristic of the continuously variable transmission, correction operations are frequently carried out after the actual gear shift ratio has coincided with the parameter identified dynamic characteristic.

Therefore, such a problem that if a mechanical drive means such as the stepping motor is used in the gear shift ratio varying mechanism, a high durable stepping motor needs to be adopted since the correction operations described above cause heat generations in the stepping motor so that the deterioration in the oil viscosity is easy to be promoted.

However, in a case where the inputs of the disturbance compensator 450 shown in FIGS. 9 and 10 are the actual gear shift ratio and the angular position indicative signal of the gear shift ratio varying mechanism (stepping motor), the nonlinear operation characteristic in the gear shift ratio varying mechanism is reflected in the disturbance compensator so that the frequent occurrences of correction operations can be avoided.

FIGS. 13A and 13B show their simulation results presenting the avoidance of the frequent correction operations.

In FIGS. 13A and 13B, the solid line denotes the simulation result of the target gear shift ratio response, broken lines denotes the simulation results of the control apparatus according to the present invention, and the dotted lines denote the simulation results of a comparative example of the control apparatus.

As denoted by the broken line of FIG. 13B, the frequent correction operations after the gear shift ratio was reached to the target gear shift ratio were suppressed.

The following equation (10) represents another method of calculating the gear shift ratio command value $Si_p$ and FIG. 14 shows the hardware equivalent circuit of the equation (10). FIG. 15 shows the characteristic graph of a cut-off frequency in the control apparatus shown in FIG. 14.

$$Si_p(t)=C_2(i_p)\times\{C_1(i_p)\times\{i_{pT}(t)-i_{pR}(t)\}-G_{cs}(s)\times Si_p(t)\}$$ (10), wherein $G_{cs}(s)=\{(1/T_p(i_p)s+1]-\{\exp(-Ls)/T_p(i_p)s+1\}$ and wherein $Si_p(t)$ in the right side of the equation (10) denotes a previous value of the gear shift ratio command value of $Si_p(t)$.

In addition, the desired gear shift ratio response characteristic can be achieved using a feedforward compensator as expressed in the following equation (11).

FIG. 16 shows the circuit block diagram of the hardware equivalent circuit of the equation (11).

FIG. 17 shows the characteristic graph of the cut-off frequency of the control apparatus equivalent circuit shown in FIG. 16.

$$Si_p=\{T_p)i_p s+1\}i_{pT}(t)/(T_T s+1)$$ (11).

Furthemore, FIG. 18 shows the circuit block diagram of the hardware equivalent circuit of the control apparatus in which the structure of the disturbance compensator is simplified. The same control effect as described above can be achieved by the control apparatus shown in FIG. 18.

It is noted that a controlled object having a transfer function of $K_p(i_p)/\{T_p(i_p)s+1\}\times e^{-Ls}$ denotes the shift ratio varying mechanism of the continuously variable transmission.

In FIG. 8, the dynamic characteristic compensator has the transfer function of $Gp(s)$ expressed in the equation (1), the disturbance compensator has the transfer function shown in FIG. 8 and outputs the external disturbance compensation output $i_{pD}(t)$ expressed in the equation (2) to a first subtractor, and the gear shifting (shift) ratio command value-to-the stepping motor angular position command value conversion map derives $G_T(s)$ and $S_{ip}(t)$ expressed in the equations (3) and (4). In FIGS. 9 and 10, the disturbance compensator receives the gear shift ratio command value from the stepping motor angular position adjusting block (circuit) via the inverted map in the same way as described in FIG. 8.

In FIG. 14, the dynamic characteristic compensator outputs $S_{ip}(t)$ expressed in the equation (10) to the gear shifting (shift) ratio command value-to-the stepping motor angular position command value conversion map.

In FIG. 16, the dynamic characteristic compensator outputs $S_{ip}(t)$ expressed in the equation (11) to the conversion map. In FIG. 18, the disturbance compensator has two transfer function blocks and the single subtractor.

It is finally noted that the disturbance compensator described above is also called a robust compensator which is exemplified by a U.S. Pat. No. 5,444,346 issued on Aug. 22, 1995 (the disclosure of which is herein incorporated by reference).

What is claimed is:

1. A control apparatus for an automotive vehicle, comprising:

a) a continuously variable transmission, including a gear shift ratio varying mechanism and whose gear shift ratio is continuously controlled according to an operating variable of said gear shift ratio varying mechanism, said gear shift ratio varying mechanism being so arranged and constructed as to continuously vary the gear shift ratio of the continuously variable transmission according to a gear shift ratio command value;

b) a first sensor which is so arranged and constructed as to detect a vehicle driving condition of the vehicle in which the continuously variable transmission is mounted;

c) a second sensor which is so arranged and constructed as to detect an actual gear shift ratio of the continuously variable transmission; and d) a control unit having;

e) a target gear shift ratio calculating block for calculating a target gear shift ratio on the basis of the detected vehicle driving condition;

f) a dynamic characteristic estimating block for estimating a predetermined dynamic characteristic for each instantaneous gear shift ratio of the continuously variable transmission;

g) a disturbance compensator which is so arranged and constructed as to calculate a disturbance compensation output as functions of the actual gear shift ratio and of either the gear shift ratio command value or the operating variable of the gear shift ratio varying mechanism;

h) a gear shift ratio control constant calculating block for calculating a control constant of each instantaneous gear shift ratio of the continuously variable transmission so as to achieve a target dynamic characteristic using the estimated dynamic characteristic;

i) a first gear shift ratio command calculating block for calculating a first gear shift ratio command value from the target gear shift ratio, the actual gear shift ratio, and the control constant of the corresponding instantaneous gear shift ratio; and j) a second gear shift ratio command calculating block for subtracting the disturbance compensation output of the disturbance compensator from the first gear shift ratio command value so as to derive and output the gear shift ratio command value, and the control apparatus further comprising;

k) a gear shift ratio control block for adjustably controlling the operating variable of the gear shift ratio varying mechanism as the function of the output gear shift ratio command value.

2. A control apparatus for an automotive vehicle as claimed in claim 1, wherein said disturbance compensator comprises a first disturbance compensator, having a transfer function of a previously set low pass filter, for receiving the gear shift ratio command value of the gear shift command value calculating block and calculating a first disturbance compensation output as the function of the received gear shift command value; a second disturbance compensator, having a transfer function of another low pass filter which is a multiplication of the transfer function of the first disturbance compensator by an inverse of a transfer function of a still another low pass filter in which the estimated value of the dynamic characteristic is used, for receiving the actual gear shift ratio and calculating a second disturbance compensator as the function of the actual gear shift ratio of the continuously variable transmission; and a disturbance compensation output block for subtracting an output of the first disturbance compensator from an output of the second disturbance compensator to derive the disturbance compensation output.

3. A control apparatus for an automotive vehicle as claimed in claim 2, wherein the disturbance compensation output $i_{pD}(t)$ of the disturbance compensator is expressed as:

$$i_{pD}(t) = \{T_H(i_p)s+1\}/\{T_p(i_p)s+1\} \cdot i_{pR}(t) - \exp^{-Ls}/\{T_H(i_p)s+1\} \cdot Si_p(t),$$

wherein t denotes a time, $T_H(i_p)$ denotes a cut-off frequency of the low pass filter of the first disturbance compensator, $i_{pR}(t)$ denotes the actual gear shift ratio, s denotes a differential operator ($s=\sigma+j\omega$ and corresponds to a Laplace transform operator), $T_p(i_p)$ denotes a time constant of the continuously variable transmission and determined for each instantaneous gear shift ratio and a varying direction of the gear shift ratio, L denotes a dead time, exp denotes an exponential function, and $Si_p(t)$ denotes the gear shift ratio command value.

4. A control apparatus for an automotive vehicle, as claimed in claim 3, wherein the dynamic characteristic Gp(s) for each gear shift ratio of the continuously variable transmission which is estimated by the dynamic characteristic estimating block is expressed as: $Gp(s)=Kp(i_p) \cdot \exp^{-Ls}/\{Tp(i_p)s+1\}$, wherein $Kp(i_p)$ denotes a gain of the continuously variable transmission.

5. A control apparatus for an automotive vehicle, as claimed in claim 4, wherein the target dynamic characteristic $G_T(s)$ which a designer of the control apparatus is desired to achieve is expressed as: $G_T(s)=\exp^{-Ls}/(T_Ts+1)$ wherein $T_T$ denotes a time constant corresponding to a designed target gear shift ratio response.

6. A control apparatus for an automotive vehicle, as claimed in claim 5, wherein the gear ratio command value is expressed as: $Sip(t)=C_2(i_p)\{C_1(i_p(t)-i_{PR}(t)\}-i_{pD}(t)$, wherein $C_1(i_p)=Tp(i_p)-T_T\}$ and $C_2(i_p)=\{T_T/T_p(i_p)\}-1$, $i_{pT}$ denotes the target gear shift ratio at the time of t, and $i_{pR}(t)$ denotes the actual gear shift ratio at the time of t.

7. A control apparatus for an automotive vehicle, as claimed in claim 6, wherein said gear ratio varying mechanism comprises: a gear shift ratio control valve which is so arranged and constructed as to variably control a hydraulic pressure supplied to the continuously variable transmission so as to continuously vary the gear shift ratio of the continuously variable transmission; and a stepping motor associated with the gear shift ratio control valve and which is so arranged and constructed as to control an opening angle of the gear shift ratio control valve according to its angular position approximately corresponding to the gear shift ratio command value and which further comprises conversion determination means for determining a conversion quantity from the gear shift ratio command value into the corresponding angular position of the stepping motor using the following equations:

$$r_i = \{Ds/2\tan(\beta)\}+r_{io},$$

$$r_o = [2r_i-\pi Dc+\{(2r_i-\pi Dc)^2-4(r_i^2+D_cr_i+Dc(2Dc-L_B))\}^{1/2}]/2,$$

$$i_p = r_o/r_b$$

wherein $r_i$ denotes a radius of a belt contacting part of a drive pulley of the continuously variable transmission, Ds denotes a displacement of a belt within an spatial interval of the drive pulley and corresponds to the angular position of the stepping motor, $r_{io}$ denotes a minimum radius of the drive pulley, $r_o$ denotes a radius of a belt contacting part of a driven pulley of the continuously variable transmission, Dc denotes an interaxial distance between the drive pulley and the driven pulley, $L_B$ denotes a circumferential length of the belt, and $\beta$ denotes a sheave angle of the pulleys, $i_p$ denotes the gear shift ratio which has a proportional relationship to the gear shift command value.

8. A control apparatus for an automotive vehicle, as claimed in claim 7, wherein said conversion quantity determining means comprises a map representing the relationship between the gear shift ratio command value and the angular position of the stepping motor and which has already determined according to an experiment.

9. A control apparatus for an automotive vehicle, as claimed in claim 1, wherein said disturbance compensator comprises: a first disturbance compensator, having a transfer function of a low pass filter using the estimated value of the dynamic characteristic, for calculating and outputting a first disturbance compensation output as a function of the gear shift ratio command value, a subtractor for subtracting the first disturbance compensation output from the actual gear shift ratio, and a second disturbance compensator, having a transfer function of another low pass filter which is a multiplication of the transfer function of the first disturbance compensator by an inverse of a transfer function of a still another low pass filter previously set, for calculating and outputting a second disturbance compensation output as the function of the subtracted result of the subtractor, said second disturbance compensation output serving as the disturbance compensation output of the disturbance compensator.

10. A control apparatus for an automotive vehicle, as claimed in claim 9, wherein said disturbance compensation output of the disturbance compensator is expressed as:

$$i_{pD}(t)=\{T_H(i_p)s+1\}/\{Tp(i_p)s+1\}\cdot\{i_{pR}(t)-\exp^{-Ls}/\{T_H(i_p)s+1\}\},$$

wherein t denotes a time, $T_H(i_p)$ denotes a cut-off frequency of the low-pass filter in each of the first and second disturbance compensators and is determined so that the dynamic characteristic of the continuously variable transmission and a stability of the control apparatus are satisfied, $Tp(i_p)$ denotes a time constant of the continuously variable transmission which is determined for each gear shift ratio and each direction of the gear shift ratio, $i_{pR}(t)$ denotes the actual gear shift ratio at the time of t, L denotes a dead time, s denotes a differential operator, and exp denotes an exponential function.

* * * * *